US011808467B2

(12) United States Patent
Bonvini et al.

(10) Patent No.: US 11,808,467 B2
(45) Date of Patent: Nov. 7, 2023

(54) CUSTOMIZED INSTANTIATION OF PROVIDER-DEFINED ENERGY SAVING SETPOINT ADJUSTMENTS

(71) Applicant: Google LLC, Mountain View, CA (US)

(72) Inventors: Marco Bonvini, Arco (IT); Kristoffer J. Donhowe, Mountain View, CA (US); Ramya Bhagavatula, Palo Alto, CA (US); Eric Hayashi, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/578,809

(22) Filed: Jan. 19, 2022

(65) Prior Publication Data

US 2023/0228437 A1  Jul. 20, 2023

(51) Int. Cl.
  *F24F 11/47* (2018.01)
  *F24F 11/65* (2018.01)
  (Continued)

(52) U.S. Cl.
  CPC .............. *F24F 11/47* (2018.01); *F24F 11/65* (2018.01); *G05B 19/042* (2013.01); *F24F 2140/60* (2018.01); *G05B 2219/2614* (2013.01)

(58) Field of Classification Search
  CPC ........ F24F 11/47; F24F 11/65; F24F 2140/60; G05B 19/042; G05B 2219/2614
  See application file for complete search history.

(56) References Cited

U.S. PATENT DOCUMENTS 4,223,831 A   9/1980  Szarka
4,298,946 A  11/1981  Hartsell et al.
(Continued)

FOREIGN PATENT DOCUMENTS

CA   2202008 C    2/2000
EP    196069 B1  12/1991
(Continued)

OTHER PUBLICATIONS

EP Patent Application No. 14785485.5 filed Apr. 15, 2014 Extended European Search Report dated Nov. 3, 2016, all pages.
(Continued)

*Primary Examiner* — Michael W Choi
(74) *Attorney, Agent, or Firm* — Kilpatrick Townsend & Stockton LLP

(57) ABSTRACT

Techniques for instantiating energy saving setpoint adjustments are described. In an example, a heating, ventilation, and air conditioning (HVAC) system is controlled via a thermostat during a first time period according to a first temperature setpoint schedule including one or more temperature setpoints and a first usage amount of the HVAC system is monitored during the first time period. After it is determined that the first usage amount of the HVAC system during the first time period has met a first predefined HVAC runtime threshold criterion, a second temperature setpoint schedule is generated with at least one of the one or more temperature setpoints being adjusted to decrease energy usage by the HVAC system compared to the first temperature setpoint schedule. The HVAC system is then controlled via the thermostat during a second time period according to the second temperature setpoint schedule.

20 Claims, 7 Drawing Sheets

(51) Int. Cl.
*G05B 19/042* (2006.01)
*F24F 140/60* (2018.01)

(56) References Cited

U.S. PATENT DOCUMENTS

| | | |
|---|---|---|
| 4,335,847 A | 6/1982 | Levine |
| 4,408,711 A | 10/1983 | Levine |
| 4,615,380 A | 10/1986 | Beckey |
| 4,674,027 A | 6/1987 | Beckey |
| 4,685,614 A | 8/1987 | Levine |
| 4,751,961 A | 6/1988 | Levine et al. |
| 4,847,781 A | 7/1989 | Brown, III et al. |
| 5,088,645 A | 2/1992 | Bell |
| 5,211,332 A | 5/1993 | Adams |
| 5,240,178 A | 8/1993 | Dewolf et al. |
| 5,395,042 A | 3/1995 | Riley et al. |
| 5,462,225 A | 10/1995 | Massara et al. |
| 5,476,221 A | 12/1995 | Seymour |
| 5,499,196 A | 3/1996 | Pacheco |
| 5,544,036 A | 8/1996 | Brown, Jr. et al. |
| 5,555,927 A | 9/1996 | Shah |
| 5,611,484 A | 3/1997 | Uhrich |
| 5,761,083 A | 6/1998 | Brown, Jr. et al. |
| 5,816,491 A | 10/1998 | Berkeley et al. |
| 5,902,183 A | 5/1999 | D'Souza |
| 5,909,378 A | 6/1999 | De Milleville |
| 5,977,964 A | 11/1999 | Williams et al. |
| 6,062,482 A | 5/2000 | Gauthier et al. |
| 6,098,893 A | 8/2000 | Berglund et al. |
| 6,122,603 A | 9/2000 | Budike, Jr. |
| 6,216,956 B1 | 4/2001 | Ehlers et al. |
| 6,311,105 B1 | 10/2001 | Budike, Jr. |
| 6,349,883 B1 | 2/2002 | Simmons et al. |
| 6,356,204 B1 | 3/2002 | Guindi et al. |
| 6,574,581 B1 | 6/2003 | Bohrer et al. |
| 6,643,567 B2 | 11/2003 | Kolk et al. |
| 6,645,066 B2 | 11/2003 | Gutta et al. |
| 6,769,482 B2 | 8/2004 | Wagner et al. |
| 6,785,630 B2 | 8/2004 | Kolk et al. |
| 6,975,958 B2 | 12/2005 | Bohrer et al. |
| 7,024,336 B2 | 4/2006 | Salsbury et al. |
| 7,333,880 B2 | 2/2008 | Brewster et al. |
| 7,346,467 B2 | 3/2008 | Bohrer et al. |
| RE40,437 E | 7/2008 | Rosen |
| 7,469,550 B2 | 12/2008 | Chapman, Jr. et al. |
| 7,644,869 B2 | 1/2010 | Hoglund et al. |
| 7,702,424 B2 | 4/2010 | Cannon et al. |
| 7,784,704 B2 | 8/2010 | Harter |
| 7,802,618 B2 | 9/2010 | Simon et al. |
| 7,848,900 B2 | 12/2010 | Steinberg et al. |
| 7,854,389 B2 | 12/2010 | Ahmed |
| 7,908,116 B2 | 3/2011 | Steinberg et al. |
| 7,908,117 B2 | 3/2011 | Steinberg et al. |
| 8,010,237 B2 | 8/2011 | Cheung et al. |
| 8,019,567 B2 | 9/2011 | Steinberg et al. |
| 8,090,477 B1 | 1/2012 | Steinberg |
| 8,131,497 B2 | 3/2012 | Steinberg et al. |
| 8,131,506 B2 | 3/2012 | Steinberg et al. |
| 8,180,492 B2 | 5/2012 | Steinberg |
| 9,298,197 B2 | 3/2016 | Matsuoka et al. |
| 2004/0034484 A1 | 2/2004 | Solomita, Jr. et al. |
| 2004/0249479 A1 | 12/2004 | Shorrock |
| 2005/0119793 A1 | 6/2005 | Amundson et al. |
| 2005/0128067 A1 | 6/2005 | Zakrewski |
| 2005/0189429 A1 | 9/2005 | Breeden |
| 2005/0280421 A1 | 12/2005 | Yomoda et al. |
| 2006/0186214 A1 | 8/2006 | Simon et al. |
| 2006/0196953 A1 | 9/2006 | Simon et al. |
| 2007/0241203 A1 | 10/2007 | Wagner et al. |
| 2008/0015740 A1 | 1/2008 | Osann |
| 2008/0015742 A1 | 1/2008 | Kulyk et al. |
| 2008/0191045 A1 | 8/2008 | Harter |
| 2008/0217418 A1 | 9/2008 | Helt et al. |
| 2008/0317292 A1 | 12/2008 | Baker et al. |
| 2009/0059814 A1 | 3/2009 | Nixon et al. |
| 2009/0099699 A1 | 4/2009 | Steinberg et al. |
| 2009/0125151 A1 | 5/2009 | Steinberg et al. |
| 2009/0171862 A1 | 7/2009 | Harrod et al. |
| 2009/0254225 A1 | 10/2009 | Boucher et al. |
| 2009/0259713 A1 | 10/2009 | Blumrich et al. |
| 2010/0019051 A1 | 1/2010 | Rosen |
| 2010/0025483 A1 | 2/2010 | Hoeynck et al. |
| 2010/0070084 A1 | 3/2010 | Steinberg et al. |
| 2010/0070086 A1 | 3/2010 | Harrod et al. |
| 2010/0070234 A1 | 3/2010 | Steinberg et al. |
| 2010/0084482 A1 | 4/2010 | Kennedy et al. |
| 2010/0211224 A1 | 8/2010 | Keeling et al. |
| 2010/0262298 A1 | 10/2010 | Johnson et al. |
| 2010/0262299 A1 | 10/2010 | Cheung et al. |
| 2010/0280667 A1 | 11/2010 | Steinberg |
| 2010/0282857 A1 | 11/2010 | Steinberg |
| 2010/0286937 A1 | 11/2010 | Hedley et al. |
| 2010/0289643 A1 | 11/2010 | Trundle et al. |
| 2010/0308119 A1 | 12/2010 | Steinberg et al. |
| 2010/0318227 A1 | 12/2010 | Steinberg et al. |
| 2011/0015797 A1 | 1/2011 | Gilstrap |
| 2011/0015798 A1 | 1/2011 | Golden et al. |
| 2011/0015802 A1 | 1/2011 | Imes |
| 2011/0022242 A1 | 1/2011 | Bukhin et al. |
| 2011/0046792 A1 | 2/2011 | Imes et al. |
| 2011/0046805 A1 | 2/2011 | Bedros et al. |
| 2011/0046806 A1 | 2/2011 | Nagel et al. |
| 2011/0077896 A1 | 3/2011 | Steinberg et al. |
| 2011/0106328 A1 | 5/2011 | Zhou et al. |
| 2011/0166828 A1 | 7/2011 | Steinberg et al. |
| 2011/0185895 A1 | 8/2011 | Freen |
| 2011/0290893 A1 | 12/2011 | Steinberg |
| 2011/0307103 A1 | 12/2011 | Cheung et al. |
| 2012/0053745 A1 | 3/2012 | Ng |
| 2012/0065783 A1 | 3/2012 | Fadell et al. |
| 2012/0065935 A1 | 3/2012 | Steinberg et al. |
| 2012/0085831 A1 | 4/2012 | Kopp |
| 2012/0086562 A1 | 4/2012 | Steinberg |
| 2012/0089523 A1 | 4/2012 | Hurri et al. |
| 2012/0125559 A1 | 5/2012 | Fadell et al. |
| 2012/0131504 A1 | 5/2012 | Fadell et al. |
| 2012/0158350 A1 | 6/2012 | Steinberg et al. |
| 2012/0165993 A1 | 6/2012 | Whitehouse |
| 2012/0221151 A1 | 8/2012 | Steinberg |
| 2012/0259469 A1 | 10/2012 | Ward et al. |
| 2012/0310416 A1 | 12/2012 | Tepper et al. |
| 2013/0087629 A1 | 4/2013 | Stefanski et al. |
| 2016/0305681 A1* | 10/2016 | Matsuoka ............ G05D 23/1919 |
| 2017/0045864 A1* | 2/2017 | Fadell ..................... G05B 15/02 |
| 2019/0257542 A1* | 8/2019 | Matsuoka ................ F24F 11/46 |
| 2020/0041157 A1* | 2/2020 | Salsbury .................. F24F 11/46 |
| 2021/0055012 A1* | 2/2021 | Rigg ........................ F24F 11/61 |
| 2022/0341617 A1* | 10/2022 | Spalink ............. G05B 23/0237 |

FOREIGN PATENT DOCUMENTS

| | | |
|---|---|---|
| JP | 59106311 A | 6/1984 |
| JP | 01252850 A | 10/1989 |
| WO | 2010033563 A1 | 3/2010 |
| WO | 2011149600 A2 | 12/2011 |
| WO | 2012024534 A2 | 2/2012 |
| WO | 2012/068591 A2 | 5/2012 |
| WO | 2012/092622 A2 | 7/2012 |
| WO | 2014/172389 A1 | 10/2014 |

OTHER PUBLICATIONS

International Search Report and Written Opinion dated Aug. 29, 2014 for PCT/US2014/034244 filed on Apr. 15, 2014, 10 pages.
International Preliminary Report on Patentability dated Oct. 20, 2015 for PCT/US2014/033394, all pages.
Allen et al., "Real-Time Earthquake Detection and Hazard Assessment by ElarmS Across California", Geophysical Research Letters, vol. 36, L00B08, 2009, pp. 1-6.
Aprilaire Electronic Thermostats Model 8355 User's Manual, Research Products Corporation, 2000, 16 pages.
Arens et al., "Demand Response Electrical Appliance Manager—User Interface Design, Development and Testing", Poster, Demand

(56) References Cited

OTHER PUBLICATIONS

Response Enabling Technology Development, University of California Berkeley, Retrieved from dr.berkeley.edu/dream/posters/2005_6GUIposter.pdf, 2005, 1 page.
Arens et al., "Demand Response Enabled Thermostat—Control Strategies and Interface", Demand Response Enabling Technology Development Poster, University of California Berkeley, Retrieved from dr.berkeley.edu/dream/posters/2004_11CEC_TstatPoster.pdf, 2004, 1 page.
Arens et al., "Demand Response Enabling Technology Development", Phase I Report: Jun. 2003-Nov. 2005, Jul. 27, P:/DemandRes/ UC Papers/DR-Phase1Report-Final DraftApril24-26.doc, University of California Berkeley, pp. 1-108.
Arens et al., "New Thermostat Demand Response Enabling Technology", Poster, University of California Berkeley, Jun. 10, 2004.
Auslander et al., "UC Berkeley DR Research Energy Management Group", PowerPoint Presentation, DR ETD Workshop, State of California Energy Commission, Jun. 11, 2007, pp. 1-35.
Braeburn 5300 Installer Guide, Braeburn Systems, LLC, 2009, 10 pages.
Braeburn Model 5200, Braeburn Systems, LLC, 2011, 11 pages.
Chen et al., "Demand Response-Enabled Residential Thermostat Controls", Abstract, ACEEE Summer Study on Energy Efficiency in Buildings, Mechanical Engineering Dept. and Architecture Dept., University of California Berkeley., 2008, pp. 1-24 through 1-36.
De Almeida et al., "Advanced Monitoring Technologies for the Evaluation of Demand-Side Management Programs", Energy, vol. 19, No. 6, 1994, pp. 661-678.
Deleeuw, "Ecobee WiFi Enabled Smart Thermostat Part 2: The Features Review", Retrieved from <URL: http://www.homenetworkenabled.com/content.php?136-ecobee-WiFi-enabled-Smart-Thermostat-Part-2-The-Features-review>, Dec. 2, 2011, 5 pages.
Ecobee Smart Si Thermostat Installation Manual, Ecobee, 2012, 40 pages.
Ecobee Smart Si Thermostat User Manual, Ecobee, 2012, 44 pages.
Ecobee Smart Thermostat Installation Manual, 2011, 20 pages.
Ecobee Smart Thermostat User Manual, 2010, 20 pages.
Electric Heat Lock Out on Heat Pumps, Washington State University Extension Energy Program, Apr. 2010, pp. 1-3.
Gao et al., "The Self-Programming Thermostat: Optimizing Setback Schedules Based on Home Occupancy Patterns", In Proceedings of the First ACM Workshop on Embedded Sensing Systems for Energy-Efficiency in Buildings, Nov. 3, 2009, 6 pages.
Gevorkian, "Alternative Energy Systems in Building Design", 2009, pp. 195-200.
Hoffman et al., "Integration of Remote Meter Reading, Load Control and Monitoring of Customers' Installations for Customer Automation with Telephone Line Signaling", Electricity Distribution, 1989. CIRED 1989. 10th International Conference on, May 8-12, 1989, pp. 421-424.
Honeywell Installation Guide FocusPRO TH6000 Series, Honeywell International, Inc., 2012, 24 pages.
Honeywell Operating Manual FocusPRO TH6000 Series, Honeywell International, Inc., 2011, 80 pages.
Honeywell Prestige IAQ Product Data 2, Honeywell International, Inc., 2012, 126 pages.
Honeywell Prestige THX9321-9421 Operating Manual, Honeywell International, Inc., 2011, 120 pages.
Honeywell Prestige THX9321 and TXH9421 Product Data, Honeywell International, Inc., 68-0311, Jan. 2012, 126 pages.
Hunter Internet Thermostat Installation Guide, Hunter Fan Co., 2012, 8 pages.
Introducing the New Smart Si Thermostat, Datasheet [online]. Ecobee, No Date Given [retrieved on Feb. 25, 2013]. Retrieved from the Internet: <URL: https://www.ecobee.com/solutions/home/smart-si/>.
Lennox ComfortSense 5000 Owners Guide, Lennox Industries, Inc., 2007, 32 pages.
Lennox ComfortSense 7000 Owners Guide, Lennox Industries, Inc., 2009, 15 pages.
Lennox iComfort Manual, Lennox Industries, Inc., 2010, 20 pages.
Levy, "A Vision of Demand Response—2016", The Electricity Journal, vol. 19, Issue 8, Oct. 2006, pp. 12-23.
Loisos et al., "Buildings End-Use Energy Efficiency: Alternatives to Compressor Cooling", California Energy Commission, Public Interest Energy Research, Jan. 2000, 80 pages.
Lopes, "Case Studies in Advanced Thermostat Control for Demand Response", AEIC Load Research Conference, St. Louis, MO, Jul. 2004, 36 pages.
Lu et al., "The Smart Thermostat: Using Occupancy Sensors to Save Energy in Homes", In Proceedings of the 8th ACM Conference on Embedded Networked Sensor Systems, Nov. 3-5, 2010, pp. 211-224.
Lux PSPU732T Manual, LUX Products Corporation, Jan. 6, 2009, 48 pages.
Martinez, "SCE Energy$mart Thermostat Program", Advanced Load Control Alliance, Oct. 5, 2004, 20 pages.
Matty, "Advanced Energy Management for Home Use", IEEE Transaction on Consumer Electronics, vol. 35, No. 3, Aug. 1989, pp. 584-588.
Motegi et al., "Introduction to Commercial Building Control Strategies and Techniques for Demand Response", Demand Response Research Center, May 22, 2007, 35 pages.
Mozer, "The Neural Network House: An Environmental that Adapts to it's Inhabitants", AAAI Technical Report SS-98-02, 1998, pp. 110-114.
Mozer, M. et al., "The Neurothermostat: Predictive Optimal Control of Residential Heating Systems" appearing in M. Mozer et al. *Adv. in Neural Info. Proc.Systems 9*, Cambridge, MA: MIT Press. 1997, pp. 953-959.
NetX RP32-WIFI Network Thermostat Consumer Brochure, Network Thermostat, May 2011, 2 pages.
NetX RP32-WIFI Network Thermostat Specification Sheet, Network Thermostat, 2012, 2 pages.
Peffer et al., "A Tale of Two Houses: The Human Dimension of Demand Response Enabling Technology from a Case Study of Adaptive Wireless Thermostat", Abstract, ACEEE Summer Study on Energy Efficiency in Buildings, Architecture Dept. and Mechanical Engineering Dept., University of California Berkeley., 2008, pp. 7-242 through 7-253.
Peffer et al., "Smart Comfort at Home: Design of a Residential Thermostat to Achieve Thermal Comfort, and Save Money and Peak Energy", University of California Berkeley, Mar. 2007, 1 page.
RobertShaw Product Manual 9620, Maple Chase Company, 2001, 14 pages.
RobertShaw Product Manual 9825i2, Maple Chase Company, 2006, 36 pages.
SCE Energy$mart Thermostat Study for Southern California Edison—Presentation of Study Results, Population Research Systems, Project #1010, Nov. 10, 2004, 51 pages.
SYSTXCCUIZ01-V Infinity Control Installation Instructions, Carrier Corp, 2012, 20 pages.
T8611G Chronotherm IV Deluxe Programmable Heat Pump Thermostat Product Data, Honeywell International Inc., 1997, 24 pages.
TB-PAC, TB-PHP, Base Series Programmable Thermostats, Carrier Corp, 2012, 8 pages.
The Perfect Climate Comfort Center PC8900A W8900A-C Product Data Sheet, Honeywell International Inc, 2001, 44 pages.
Trane Communicating Thermostats for Fan Coil, Trane, 2011, 32 pages.
Trane Communicating Thermostats for Heat Pump Control, Trane, 2011, 32 pages.
Trane Install XL600 Installation Manual, Trane, 2006, 16 pages.
Trane XL950 Installation Guide, Trane, 2011, 20 pages.
Venstar T5800 Manual, Venstar, Inc., Sep. 7, 2011, 63 pages.
Venstar T2900Manual, Venstar, Inc., 2008, 113 pages.
VisionPRO TH8000 Series Installation Guide, Honeywell International, Inc., 2012, 12 pages.
VisionPRO TH8000 Series Operating Manual, Honeywell International, Inc., 2012, 96 pages.

(56) References Cited

OTHER PUBLICATIONS

VisionPRO Wi-Fi Programmable Thermostat, Honeywell International, Inc. Operating Manual, 2012, 48 pages.
White Rodgers (Emerson) Model 1F81-261 Installation and Operating Instructions, White Rodgers, Apr. 15, 2010, 8 pages.
White Rodgers (Emerson) Model IF98EZ-1621 Homeowner's User Guide, White Rodgers, Jan. 25, 2012, 28 pages.
Wright et al., "DR ETD—Summary of New Thermostat, TempNode, & New Meter (UC Berkeley Project)", Power Point Presentation, Public Interest Energy Research, University of California Berkeley. Retrieved from: http://dr.berkeley.edu/dream/presentations/2005_6CEC.pdf, 2005, pp. 1-49.

* cited by examiner

CUSTOMIZED INSTANTIATION OF PROVIDER-DEFINED ENERGY SAVING SETPOINT ADJUSTMENTS

BACKGROUND

A thermostat can be used to control a heating system, a cooling system, fans, ventilation systems, dehumidifiers, humidifiers, or any other related systems. Users can benefit from using a smart thermostat that can communicate via a wireless network with a cloud-based server. Such wireless network connectivity can allow for the thermostat to be controlled remotely by a user or by various services provided by the cloud-based server. Making adjustments to the temperature setpoints of a thermostat may decrease energy usage by an HVAC system controlled by the thermostat.

SUMMARY

Various embodiments are described related to customized instantiation of energy saving setpoint adjustments. In some embodiments, a method of optimizing energy consumption of a heating, ventilation, and air conditioning (HVAC) system is described. The method may comprise controlling, via a thermostat, the HVAC system during a first time period according to a first temperature setpoint schedule comprising one or more temperature setpoints. The method may further comprise monitoring, via the thermostat, a first usage amount of the HVAC system during the first time period. The method may further comprise determining that the first usage amount of the HVAC system during the first time period has met a first predefined HVAC runtime threshold criterion. After determining that the first usage amount of the HVAC system during the first time period has met the first predefined HVAC runtime threshold criterion, the method may further comprise generating a second temperature setpoint schedule comprising the one or more temperature setpoints, wherein at least one of the one or more temperature setpoints in the second temperature setpoint schedule is adjusted to decrease energy usage by the HVAC system compared to the first temperature setpoint schedule. The method may further comprise controlling, via the thermostat, the HVAC system during a second time period according to the second temperature setpoint schedule, wherein the second time period occurs after the first time period.

Embodiments of such a method may further comprise accessing historical usage data indicating a total runtime of the HVAC system during a previous time period and defining the first predefined HVAC runtime threshold criterion based on a fraction of the total runtime of the HVAC system during the previous time period. In some embodiments, accessing the historical usage data comprises receiving, from a plurality of thermostats coupled to the HVAC system, a respective runtime of the HVAC system caused by each of the plurality of thermostats during the previous time period. In some embodiments, the total runtime of the HVAC system during the previous time period is determined by adding, for each thermostat of the plurality of thermostats, the respective runtime of the HVAC system. In some embodiments, the total runtime of the HVAC system during the previous time period comprises either a first runtime of the HVAC system in a cooling mode, a second runtime of the HVAC system in a heating mode, or a summation of the first runtime and the second runtime.

In some embodiments, the method further comprises monitoring a second usage amount of the HVAC system during the second time period. The method may further comprise determining that a summation of the first usage amount and the second usage amount exceeds a second threshold criterion. The method may further comprise generating a third temperature setpoint schedule based on the second temperature setpoint schedule. The method may further comprise controlling the HVAC system during a third time period according to the third temperature setpoint schedule, wherein controlling the HVAC system according to the third temperature setpoint schedule causes the HVAC system to be active less frequently compared to the second temperature setpoint schedule.

In some embodiments, the method further comprises monitoring a plurality of usage amounts for a geographically-proximate group of HVAC systems during the first time period, wherein each HVAC system of the geographically-proximate group of HVAC systems has a respective usage amount of the plurality of usage amounts and a respective usage threshold criterion. The method may further comprise determining, for each HVAC system of the geographically-proximate group of HVAC systems, that the respective usage amount has met the respective usage threshold criterion. In some embodiments, determining that the first usage amount of the HVAC system during the first time period has met the first predefined HVAC runtime threshold criterion comprises determining, for at least a first number of the geographically-proximate group of HVAC systems, that the respective usage amount exceeds the respective usage threshold criterion.

In some embodiments, the method further comprises transmitting, to an electronic device associated with the HVAC system, a notification indicating that the first usage amount of the HVAC system during the first time period met the first predefined HVAC runtime threshold criterion, wherein the notification is transmitted before the HVAC system is controlled according to the second temperature setpoint schedule. The method may further comprise receiving, after transmitting the notification, an approval to use the second temperature setpoint schedule from an authorized user associated with the HVAC system. In some embodiments, controlling the HVAC system during the second time period is in response to receiving the approval to use the second temperature setpoint schedule.

In some embodiments, the method further comprises receiving the notification at a thermostat coupled to the HVAC system. The method may further comprise presenting the notification on a display coupled to the thermostat. The method may further comprise receiving, at an input of the thermostat, the approval of the second temperature setpoint schedule. In some embodiments, generating the second temperature setpoint schedule comprises adjusting each of the one or more temperature setpoints by a fixed temperature adjustment value. The method may further comprise transmitting, by a cloud-based server system, a request, to a computerized device linked to an authorized user of the HVAC system, for a selection between a first adjustment magnitude and a second adjustment magnitude, wherein the second adjustment magnitude is greater than the first adjustment magnitude. The method may further comprise receiving, after transmitting the request, a selection from the first adjustment magnitude and the second adjustment magnitude. In some embodiments, the at least one of the one or more temperature setpoints in the second temperature setpoint schedule is adjusted based on the selection of the first adjustment magnitude or the second adjustment magnitude.

In some embodiments, a system for optimizing energy consumption of an HVAC system is described. The system may comprise a cloud-based HVAC control server system.

The HVAC control server system may comprise one or more processors and a memory communicatively coupled with and readable by the one or more processors and having stored therein processor-readable instructions which, when executed by the one or more processors, cause the one or more processors to control the HVAC system during a first time period according to a first temperature setpoint schedule comprising one or more temperature setpoints. The one or more processors may further monitor a first usage amount of the HVAC system during the first time period. The one or more processors may further determine that the first usage amount of the HVAC system during the first time period has met a first threshold criterion. The one or more processors may further generate a second temperature setpoint schedule comprising the one or more temperature setpoints, wherein at least one of the one or more temperature setpoints in the second temperature setpoint schedule is adjusted to decrease energy usage by the HVAC system compared to the first temperature setpoint schedule. The one or more processors may further control the HVAC system during a second time period according to the second temperature setpoint schedule, wherein the second time period occurs after the first time period.

Embodiments, of such a system may further comprise a plurality of HVAC systems, the plurality of HVAC systems comprising the HVAC system. The system may further comprise a plurality of thermostats, wherein at least one of the plurality of thermostats is coupled to the HVAC system and configured to control the HVAC system according to the first setpoint temperature schedule and the second setpoint temperature schedule. In some embodiments, the plurality of HVAC systems further comprises a geographically-proximate group of HVAC systems, the geographically-proximate group of HVAC systems being geographically-proximate to the HVAC system. In some embodiments, the processor-readable instructions further cause the one or more processors to monitor a plurality of usage amounts for the geographically-proximate group of HVAC systems during the first time period, wherein each HVAC system of the geographically-proximate group of HVAC systems has a respective usage amount of the plurality of usage amounts and a respective usage threshold criterion. The processor-readable instructions may further cause the one or more processors to determine, for each HVAC system of the geographically-proximate group of HVAC systems, that the respective usage amount exceeds the respective usage threshold criterion. In some embodiments, determining that the first usage amount of the HVAC system during the first time period has met the first threshold criterion comprises determining, for at least a first number of the geographically-proximate group of HVAC systems, that the respective usage amount exceeds the respective usage threshold criterion.

In some embodiments, the system further comprises an electronic device associated with the HVAC system. The electronic device may be configured to receive, from the cloud-based HVAC control server system, a notification indicating that the first usage amount of the HVAC system during the first time period exceeded the first threshold criterion. In some embodiments, the electronic device is further configured to receive, at a user interface of the electronic device, an approval to use the second temperature setpoint schedule. In some embodiments, controlling the HVAC system during the second time period is in response to receiving the approval to use the second temperature setpoint schedule.

In some embodiments, a non-transitory processor-readable medium is described. The medium may comprise processor-readable instructions configured to cause one or more processors to control, via a thermostat, an HVAC system during a first time period according to a first temperature setpoint schedule comprising one or more temperature setpoints. The processor-readable instructions may be further configured to cause the one or more processors to monitor a plurality of usage amounts for a geographically-proximate group of HVAC systems during the first time period, wherein each HVAC system of the geographically-proximate group of HVAC systems has a respective usage amount of the plurality of usage amounts and a respective usage threshold criterion. The processor-readable instructions may be further configured to cause the one or more processors to determine, for at least a first number of the geographically-proximate group of HVAC systems, that the respective usage amount exceeds the respective usage threshold criterion. The processor-readable instructions may be further configured to cause the one or more processors to generate, after it is determined that the respective usage amount exceeds the respective usage threshold criterion for at least the first number of the geographically-proximate HVAC systems, a second temperature setpoint schedule comprising the one or more temperature setpoints, wherein at least one of the one or more temperature setpoints in the second temperature setpoint schedule is adjusted to decrease energy usage by the HVAC system compared to the first temperature setpoint schedule. The processor-readable instructions may be further configured to cause the one or more processors to control, via the thermostat, the HVAC system during a second time period according to the second temperature setpoint schedule, wherein the second time period occurs after the first time period.

In some embodiments, the processor-readable instructions are further configured to cause the one or more processors to access respective historical usage data for each HVAC system of the geographically-proximate group of HVAC systems, wherein the respective historical usage data indicates a total runtime during a previous time period. The processor-readable instructions may be further configured to cause the one or more processors to define the respective usage threshold criterion for each HVAC system of the geographically-proximate group of HVAC systems based on a fraction of the total runtime during the previous time period indicated by the respective historical usage data.

In some embodiments, the processor-readable instructions are further configured to cause the one or more processors to monitor, via the thermostat, a first usage amount of the HVAC system during a third time period. The processor-readable instructions may be further configured to cause the one or more processors to define, based on the usage amount of the HVAC system during the third time period, a usage threshold criterion for the HVAC system. The processor-readable instructions may be further configured to cause the one or more processors to determine that a second usage amount of the HVAC system during a fourth time period has met the usage threshold criterion for the HVAC system, wherein the fourth time period occurs after the third time period. The processor-readable instructions may be further configured to cause the one or more processors to control, via the thermostat, the HVAC system during a fifth time period according to a third temperature setpoint schedule, wherein the fifth time period occurs after the fourth time period. In some embodiments, the first number is determined to be the median of the geographically-proximate group of HVAC systems.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
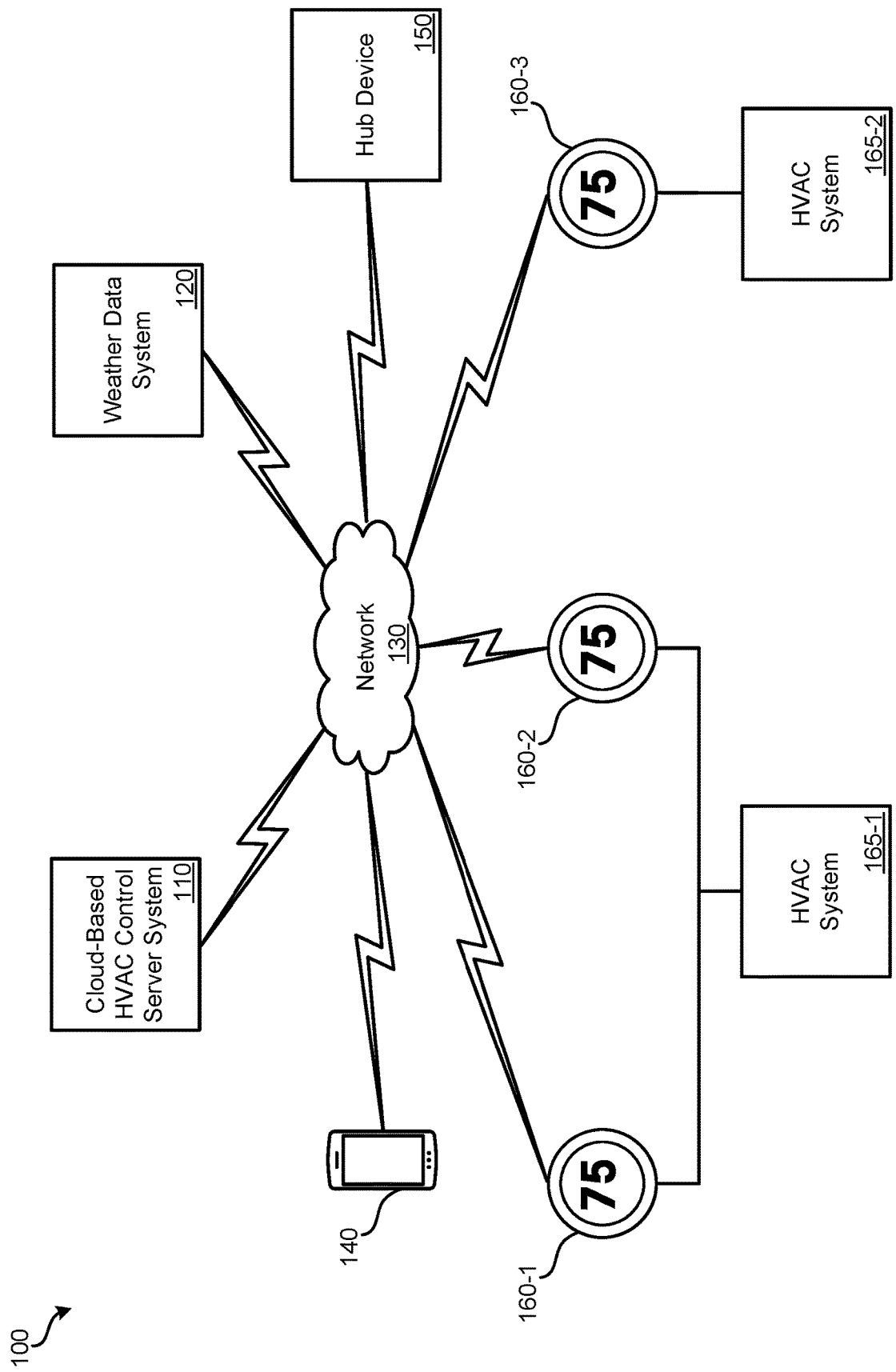
FIG. 1 illustrates an embodiment of a system for creating and managing usage-based energy saving thermostat setpoint schedules.

In many modern HVAC systems, the HVAC system can be controlled as a schedule of temperature setpoint events. For example, a user may select a schedule of temperatures (i.e., temperature setpoints) that the user desires the HVAC system to control the indoor temperature to be. Alternatively, the schedule of temperatures may be created for a user based on the preferences and habits of users to set temperature setpoints. Such a schedule of temperature setpoints may define temperatures at which the HVAC system controls the indoor temperature of the structure when the user is home, away, sleeping, or awake.

While implementation of a schedule of temperature setpoints by an HVAC system typically leads to a user being satisfied with the indoor temperature of the structure at any given time, the temperatures defined by the schedule may not reach the nexus between the user being comfortable and the user being uncomfortable. That is, there may be some difference in temperature between what the user sets as being comfortable and the temperature at which the user is actually comfortable. This can lead to inefficient schedules that consume more energy than necessary in order to provide for the desired level of user comfort.

Accordingly, energy consumption of HVAC systems may be reduced by optimizing the schedule of temperature setpoints while still ensuring user comfort. Optimized schedules of temperature setpoints may be created based on user defined and/or derived schedules of temperature setpoints, sensed data such as indoor temperature, structure occupancy, etc., predicted data such as expected outdoor temperature, user indicated preferences, and/or a variety of additional or alternative data. Such optimized schedules may then be implemented by an intelligent thermostat so as to efficiently reduce and/or redistribute both individual energy consumption and energy consumption in the aggregate.

While optimized temperature setpoint schedules may effectively reduce energy usage by an HVAC system, actually implementing the adjustments may be challenging. Approval from an authorized user associated with the HVAC system may be necessary before adjustments to a temperature setpoint schedule can be implemented and therefore reduce energy usage. However, authorized users may be reluctant to accept changes to their setpoint schedules. Accordingly, selecting the optimal time when a user is more likely to consent to the setpoint schedule adjustments may be a key factor in actually reducing energy usage. Many factors may contribute to a user being more likely to consent to schedule adjustments. For example, users may be more likely to consent to schedule adjustments after their associated HVAC system has been running in either a heating or cooling mode for some predefined period of time into a heating or cooling season. At this point, the users may have noticed that the HVAC system has started to run more frequently. This may also coincide with users receiving an energy bill, and so the cost of running the HVAC system is more likely to be front-of-mind. Each of these factors may increase the likelihood that a user will accept a proposed setpoint schedule adjustment in order to decrease energy usage by their associated HVAC system.

Further detail regarding the timing and management of temperature setpoint schedule adjustments to decrease energy usage is provided in relation to the figures. FIG. 1 illustrates an embodiment of a system 100 for creating and managing usage-based energy saving thermostat setpoint schedules. System 100 can include: cloud-based HVAC control server system 110; weather data system 120; network 130; mobile device 140; personal computer 150; and smart thermostats 160. Smart thermostat 160 can be connected to HVAC systems 165. In some embodiments, one or more of the components of system 100 may be communicatively connected to other components of system 100 via network 130.

Figure 3:
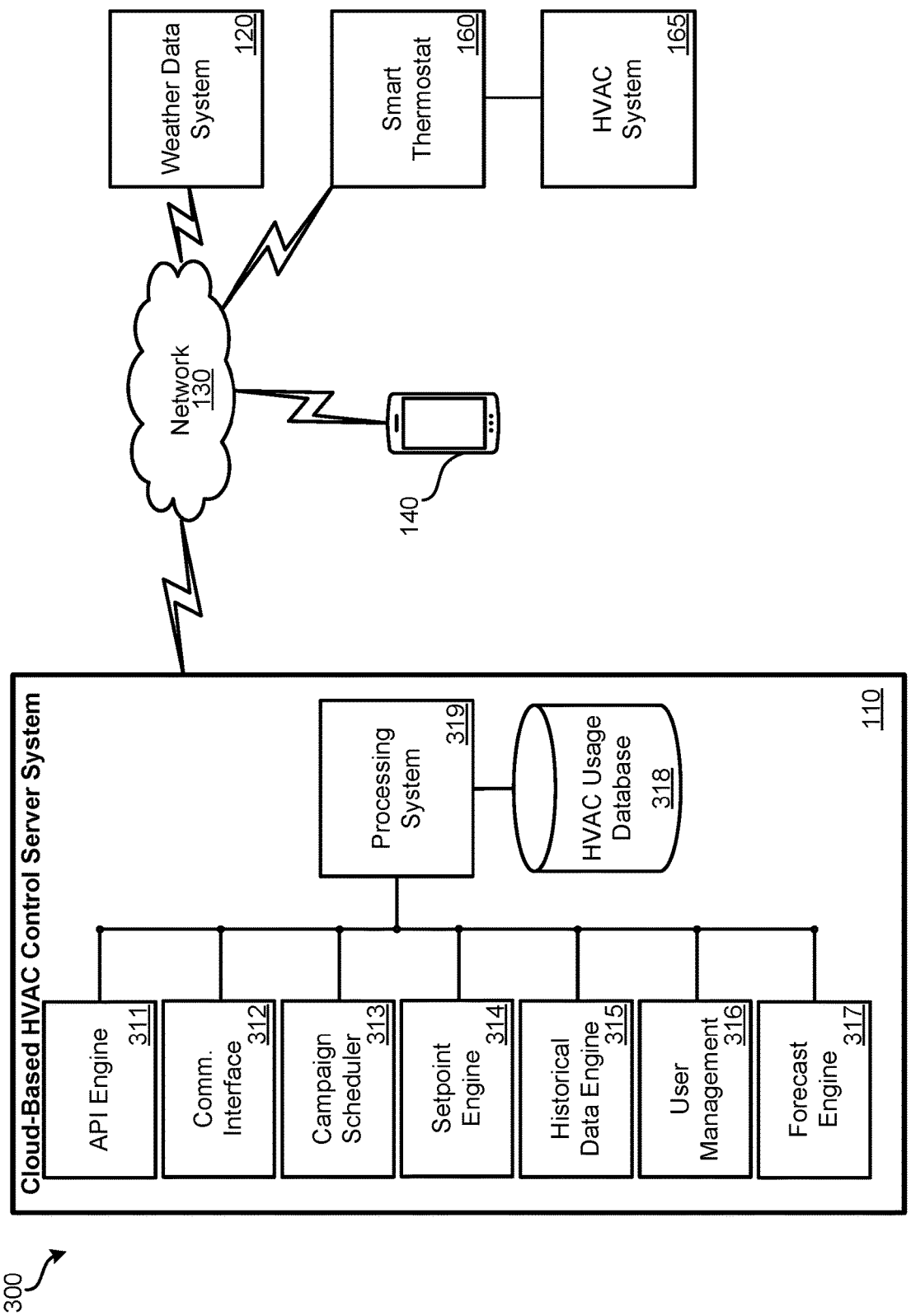
FIG. 3 illustrates an embodiment of an HVAC control system for managing thermostat setpoint schedules.

Cloud-based HVAC control server system 110 can include one or more processors configured to perform various functions, such as monitor HVAC usage and manage the generation and modification of thermostat setpoint schedules, as further described in relation to FIG. 3. Cloud-based HVAC control server system 110 can include one or more physical servers running one or more processes. Cloud-based HVAC control server system 110 can also include one or more processes distributed across a cloud-based server system. In some embodiments, cloud-based HVAC control server system 110 is connected over network 130 to any or all of the other components of system 100. For instance, cloud-based HVAC control server system 110 may connect to weather data system 120 to receive current and forecast weather data. The data received from weather data system 120 can in turn be used by cloud-based HVAC control server system 110 to manage the generation and modification of thermostat setpoint schedules. In some embodiments, cloud-based HVAC control server system 110 includes weather data system 120 and/or is connected directly to weather data system 120. For example, weather data system 120 may be one or more processes configured to monitor the weather and/or generate weather forecasts based on atmospheric data. Cloud-based HVAC control server system 110 may also connect to mobile device 140 and personal computer 150 to send notifications about upcoming setpoint schedule changes and/or updates on current or expected energy consumption by an HVAC system. For example, after generating a modified setpoint schedule for a smart thermostat, cloud-based HVAC control server system 110 may send a notification to mobile device 140 associated with an authorized user of the smart thermostat indicating that an adjusted setpoint schedule is available for the smart thermostat. Cloud-based HVAC control server system 110 can also transmit the adjusted setpoint schedules, and/or instructions to adjust a setpoint schedule, to one or more smart thermostats 160.

Network 130 can include one or more wireless networks, wired networks, public networks, private networks, and/or mesh networks. A home wireless local area network (e.g., a Wi-Fi network) may be part of network 130. Network 130 can include the Internet. Network 130 can include a mesh network, which may include one or more other smart home devices, and may be used to enable smart thermostats 160, electronic vehicle charging stations, and/or various smart appliances to communicate with another network, such as a Wi-Fi network. Smart thermostats 160 may function as edge routers that translate communications received from other devices on a relatively low power mesh network to another form of network, such as a relatively higher power network, such as a Wi-Fi network.

Mobile device 140 may be a smartphone, tablet computer, laptop computer, gaming device, or some other form of computerized device that can communicate with cloud-based HVAC control server system 110 via network 130 or can communicate directly with smart thermostats 160 (e.g., via Bluetooth® or some other device-to-device communication protocol). Similarly, hub device 150 may be a computerized device that can communicate with cloud-based HVAC server system 110 via network 130. Hub device 150 may also be configured to communicate, via network 130 and/or directly, with smart thermostats 160. For example, hub device 150 may be configured to send and receive communications via any of a variety of custom or standard wireless protocols (Wi-Fi, ZigBee®, 6LoWPAN, Thread®, Bluetooth®, BLE®, HomeKit Accessory Protocol (HAP)®, Weave®, Matter, etc.) and/or any of a variety of custom or standard wired protocols (CAT6 Ethernet, HomePlug®, etc.). In some embodiments, hub device 150 can serve as an edge router that translates communications between a mesh network and a wireless network, such as a Wi-Fi network.

A user can interact with an application executed on mobile device 140 or hub device 150 to control or interact with smart thermostats 160. For example, the user of mobile device 140, or hub device 150, can connect via network 130 to smart thermostat 160-1 at the user's home to monitor the status of smart thermostat 160-1 or send heating and cooling instructions to smart thermostat 160-1 that will in turn cause an HVAC system to provide heating or cooling to the user's home. Mobile device 140 may also be connected over network 130 to cloud-based HVAC control server system 110. For example, cloud-based HVAC control server system 110 may send notifications to the user of mobile device 140 about opportunities to participate in upcoming energy saving campaigns. As another example, cloud-based HVAC control server system 110 may send notifications and/or reminders about upcoming changes to setpoint schedules as part of an ongoing energy saving campaign. The notifications or updates may be in the form of a text message, an email, or a notification through an application.

Each smart thermostat 160 can be a smart thermostat capable of connecting to network 130 and controlling an HVAC system 165. Smart thermostats 160 may include one or more processors that may execute special-purpose software stored in a memory of smart thermostat 160. Smart thermostats 160 can include one or more sensors, such as a temperature sensor or an ambient light sensor. Smart thermostats 160 can also include an electronic display. The electronic display may include a touch sensor that allows a user to interact with the electronic display. In some embodiments, one or more notifications may be presented by the electronic display. For example, the electronic display may present a notification about upcoming changes to setpoint schedules as part of an ongoing energy saving campaign, as further described below. Smart thermostats 160 may connect via network 130 to cloud-based HVAC control server system 110. For example, smart thermostat 160 may receive instructions to make adjustments to a temperature setpoint schedule from cloud-based HVAC control server system 110. Smart thermostat 160 may also receive HVAC usage data related to the current and/or historical usage of HVAC systems 165 from cloud-based HVAC control server system 110 via network 130.

In some embodiments, smart thermostats 160 may connect via network 130 to mobile device 140 or hub device 150. For example, smart thermostats 160 may receive heating or cooling instructions from mobile device 140 associated with an authorized user of smart thermostats 160. In some embodiments, smart thermostats 160 modify energy saving temperature setpoint schedules and/or opt out of future adjustments to existing temperature setpoint schedules. For example, smart thermostats 160 may receive inputs, such as a setpoint temperature adjustment, at the thermostat that results in an adjustment to a temperature setpoint schedule. As another example, smart thermostats 160 may receive one or more instructions from mobile device 140 resulting in smart thermostats 160 no longer participating in energy saving campaigns and/or making future adjustments to a setpoint schedule to save energy.

Each smart thermostat 160 may be connected to a respective HVAC system 165. For example, as illustrated, smart thermostat 160-1 and smart thermostat 160-2 are connected to HVAC system 165-1 while smart thermostat 160-3 is connected to HVAC system 165-2. HVAC system 165-1 and HVAC system 165-2 may be associated with the same structure or separate structures. For example, smart thermostat 160-1, smart thermostat 160-2, and HVAC system 165-1 may be associated with a first structure while smart thermostat 160-3 and HVAC system may be associated with a second structure in the vicinity of the first structure. Each smart thermostat 160 may cause a respective HVAC system 165 to provide heating or cooling until a setpoint temperature measured at smart thermostat 160 has been achieved. HVAC system 165 may be any type of HVAC system such as: an electric water heater connected to a hydronic baseboard, an electric baseboard, a fan unit of a forced air system, etc.

Figure 2:
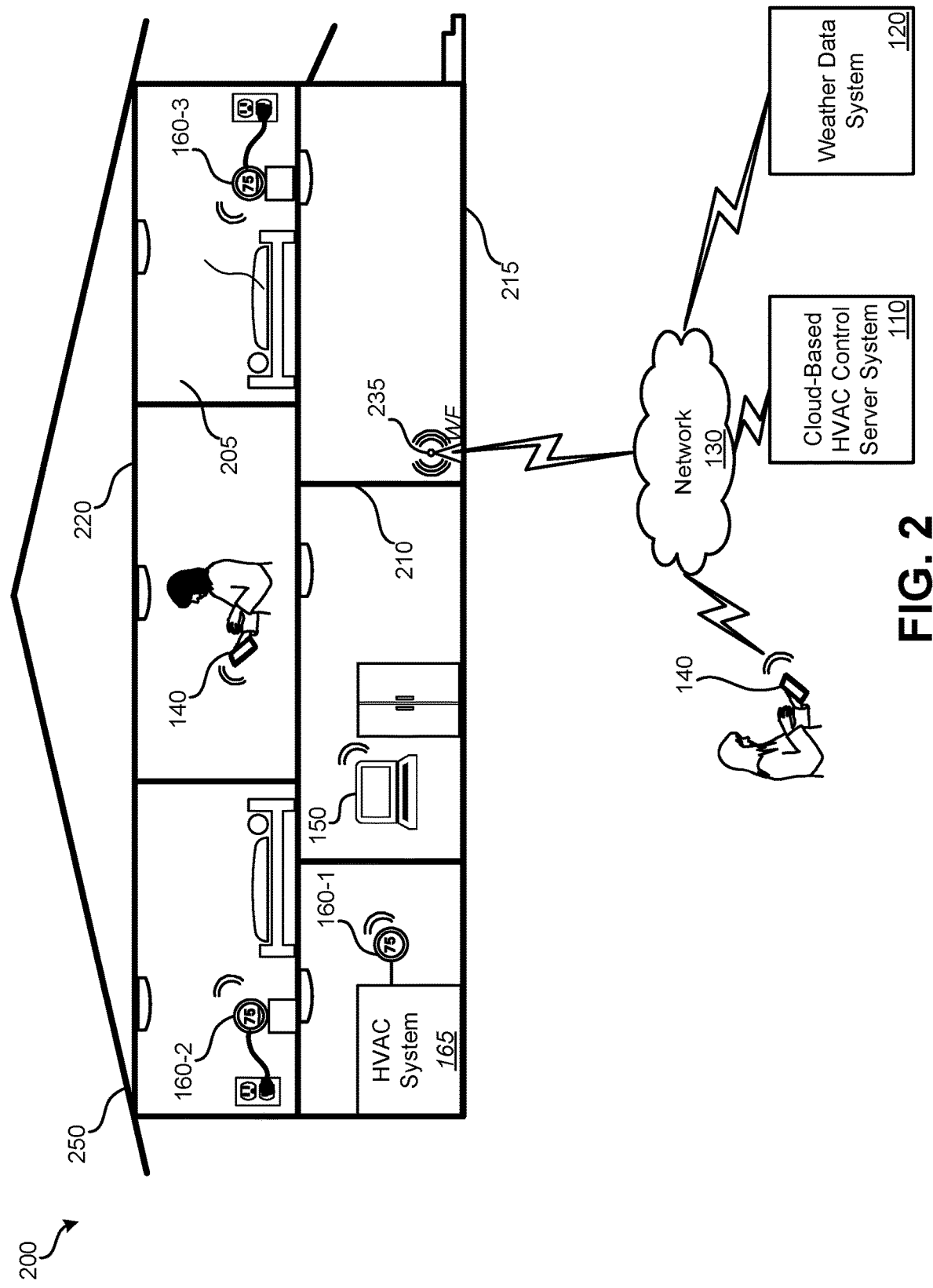
FIG. 2 illustrates an embodiment of a smart home environment within which one or more of the devices, methods, systems, services, and/or computer program products described further herein can be applicable.

FIG. 2 illustrates an example of a smart home environment 200 within which one or more of the devices, methods, systems, services, and/or computer program products described further herein can be applicable. The depicted smart home environment 200 includes structure 250. Structure 250 can include, e.g., a house, condominium, apartment, office building, garage, or mobile home. The smart home environment 200 may include multiple devices such as smart thermostats 160, hub device 150, and wireless router 235 located within structure 250. The depicted structure 250 includes a plurality of rooms 205, separated at least partly from each other via walls 210. Walls 210 can include interior walls or exterior walls. Structure 250 can further include floors 215 and ceilings 220. Devices can be mounted on, integrated with, and/or supported by walls 210, floor 215 or ceiling 220.

Smart thermostats 160, can detect ambient climate characteristics (e.g., temperature and/or humidity) and control HVAC system 165. It should be recognized that while control of an HVAC system is described herein, similar principles can equally be applied to controlling other temperature/humidity control systems, such as a heating system, an air conditioning system, a humidity control system, or any combination thereof. Smart thermostats 160 may be positioned throughout structure 250 based on the available climate zones separately controllable by HVAC system 165. For example, HVAC system 165 may support three separate climate zones within structure 250. HVAC system 165 may be configured to provide heating or cooling to one or more climate zones at a time. Each smart thermostat 160 may monitor the ambient temperature within a respective climate zone and cause HVAC system 165 to provide heating or cooling to the climate zone independent of the ambient temperature in the other climate zones throughout structure 250. For example, smart thermostat 160-1 may control a climate zone corresponding to the main floor of structure 250 while smart thermostat 160-2 and smart thermostat 160-3 control separate climate zones on the second floor of structure 250. In some embodiments, one or more climate zones may correspond to separate components of an overall HVAC system 165. For example, HVAC system 165 may include multiple cooling and/or heating devices controlled by a respective smart thermostat.

In addition to containing processing and sensing capabilities, each of the devices, such as smart thermostats 160 and hub device 150, can be capable of data communications and information sharing with each of the other devices, as well as to any cloud server or any other device that is network connected anywhere in the world, such as mobile device 140 as described above. The devices can send and receive communications via any of a variety of custom or standard wireless protocols (Wi-Fi, ZigBee, 6LoWPAN, Thread, Bluetooth, BLE, HomeKit Accessory Protocol (HAP), Weave, etc.) and/or any of a variety of custom or standard wired protocols (CAT6 Ethernet, HomePlug, etc.). Each of the devices may also be capable of receiving voice commands or other voice-based inputs from a user, such as the Google Home® interface.

Smart thermostats 160 and/or hub device 150 can communicate with each other and other devices within smart home environment 200 via wireless router 235. Smart thermostats 160 and/or hub device 150 can further communicate with remote devices via a connection to a network, such as network 130. Through network 130, smart thermostats 160 and/or hub device 150 can communicate with a central server or a cloud-computing system, such as cloud-based HVAC server system 110 and/or weather data system 120. Further, software updates can be automatically sent from the central server or cloud-computing system to the devices (e.g., when available, when purchased, or at routine intervals).

By virtue of network connectivity, one or more of the smart-home devices of FIG. 2 can further allow a user to interact with the device even if the user is not proximate to the device. For example, a user can communicate with smart thermostat 160-1 using a device such as mobile device 140. A webpage or app can be configured to receive communications from the user and control smart thermostat 160-1 based on the communications and/or to present information about the operation of smart thermostat 160-1 to the user. For example, the user can view a current setpoint temperature for smart thermostat 160-1 and adjust it using a computer. The user can be in the structure during this remote communication or outside the structure.

FIG. 3 illustrates an embodiment of an HVAC control system 300 for managing thermostat setpoint schedules. System 300 can include: cloud-based HVAC control server system 110; weather data system 120; network 130; mobile device 140; smart thermostat 160; and HVAC system 165. Smart thermostat 160 may function as detailed in relation to FIG. 1. HVAC system 165 may function as detailed in relation to FIG. 1. Network 130 may function as detailed in relation to FIG. 1.

Cloud-based HVAC control system 110 can include a plurality of services such as: API engine 311; communication interface 312; campaign scheduler 313; setpoint engine 314; historical data engine 315; user management module 316; and forecast engine 317. Cloud-based HVAC control server system 110 can also include one or more databases such as HVAC usage database 318. Cloud-based HVAC control server system 110 may further include processing system 319 that can coordinate the execution of the various functionalities provided by the plurality of services and can communicate with the one or more databases such as HVAC usage database 318.

API engine 311 may implement published interfaces from one or more external systems. The published interfaces may allow cloud-based HVAC control server system 110 to interact with various external systems to request and exchange data. API engine 311 may also allow cloud-based HVAC control server system 110 to communicate with various devices connected to network 130. For example, API engine 311 may implement an interface for sending text messages, emails, or application notifications to mobile device 140. As another example, API engine 311 may implement an interface for sending notifications to smart thermostat 160 for display. API engine 311 may also configure cloud-based HVAC control server system 110 to transmit setpoint schedule adjustment notifications to smart devices connected to network 130. For example, API engine 311 may implement an interface for smart thermostat 160.

Communication interface 312 may be used to communicate with one or more wired networks. In some embodiments, a wired network interface may be present, such as to allow communication with a local area network (LAN). Communication interface 312 may also be used to communicate with distributed services across multiple virtual machines through a virtual network. Communication interface 312 may be used by one or more of the other processes in order to communicate with the other processes or with external devices and services such as mobile device 140, weather data system 120, or smart thermostat 160.

Campaign scheduler 313 may instantiate energy saving campaigns. An energy saving campaign may include a predefined time frame during which adjustments to a temperature setpoint schedule are made in order to decrease energy usage by an HVAC system. The adjustments may be made at any point during the predefined time frame based on one or more criteria. Energy saving campaigns may include a set of parameters upon which the setpoint schedule adjustments are based. The campaign parameters may define the maximum temperature setpoint adjustment that can be made to a setpoint schedule. Selecting the maximum temperature setpoint adjustment may include striking a balance between occupant comfort and energy savings. For example, an aggressive campaign may limit adjustments to 1 degree, 2.5 degrees, 5 degrees or more, at a time, while a mild campaign may limit adjustments to 2 degrees, 1 degree, 0.5 degrees or fewer, at a time. The adjustments may be made in either Fahrenheit or Celsius. Campaign parameters may define specific times throughout the day during which setpoint temperature adjustments may be made. The times may be selected based on those times during which occupants may be less likely to notice and/or mind a change in temperature. For example, an away campaign may cause adjustments to a setpoint schedule during the middle of the day while a sleep campaign may cause adjustments to a setpoint schedule at night.

Campaign scheduler 313 may instantiate energy saving campaigns for varying durations. For example, an energy saving campaign may extend for a week, a month, a season, or a similarly suitable length of time based on the goals of the campaign. Campaign scheduler 313 may instantiate an energy saving campaign intended to extend for an entire heating or cooling season. For example, campaign scheduler 313 may initiate a cooling season campaign near the beginning of a year aimed at reducing energy usage during the summer. In some embodiments, campaign scheduler 313 instantiates energy saving campaigns based on weather forecasts. For example, campaign scheduler 313 may instantiate a campaign for HVAC systems within a certain region upon determining that the region is expected to experience a severe weather event, such as a heat wave, or a cold snap. The campaign may be instantiated to last during the expected duration of the weather event and/or until it is determined that the weather event has passed. In some embodiments, campaign scheduler 313 may instantiate multiple campaigns at the same time. For example, campaign scheduler 313 may initiate an away campaign and a sleep campaign, as described above, at the same time. Individual users may then opt in to the away campaign, the sleep campaign, or both at the same time.

In some embodiments, campaign scheduler 313 may initiate campaigns intended to make multiple setpoint schedule adjustments over the duration of the campaign. For example, an energy saving campaign may be designed to make a first adjustment to a setpoint schedule once an initial set of criteria have been met then wait to make additional adjustments until after subsequent criteria have been met. After the campaign has ended, the setpoint schedule may return to an original setpoint schedule or to a new setpoint schedule based on the time of year and expected heating and/or cooling needs. In some embodiments, the criteria are based on HVAC usage amount, such as the runtime of an HVAC system during a predefined time period. The runtime of the HVAC system may include the runtime during which the HVAC system was in a cooling mode, a heating mode, or a combination of the runtime in either mode. Additionally, or alternatively, the criteria may be based on the HVAC usage amounts for a geographically-proximate group of HVAC systems, as further described below. For example, the criteria may be based on the aggregate, median, mean, or other similar measure of the HVAC runtime for a geographically-proximate group of HVAC systems.

In some embodiments, campaign scheduler 313 determines when certain criteria have been met. For example, campaign scheduler 313 may receive HVAC usage data for HVAC system 165 associated with one or more smart thermostats, such as smart thermostat 160, from HVAC usage database 318. Campaign scheduler 313 may then analyze the usage data to determine whether the usage amount during a time period has met a predefined HVAC runtime threshold criterion. The predefined HVAC runtime threshold criterion may be based on historical HVAC usage amounts for a particular HVAC system. Upon determining that the threshold criterion has been met, campaign scheduler 313 may initiate a setpoint schedule adjustment for smart thermostat 160 to decrease energy usage by HVAC system 165. Additionally, or alternatively, campaign scheduler 313 may initiate a setpoint schedule adjustment for smart thermostat 160 upon determining that a threshold criterion usage amount for a geographically-proximate group of HVAC systems has been met.

While certain embodiments describe threshold criterion primarily in terms of a simple scalar runtime threshold metric, the scope of the present teachings also includes other types of threshold criteria, including multi-dimensional threshold criteria and/or rule-based criteria. For example, in the event an HVAC system has two-stage heating, the threshold criterion could be based on two separate thresholds: one scalar runtime threshold for the first-stage and a separate scalar runtime threshold for the second stage. In this example, meeting and/or exceeding either or both separate thresholds may be assessed when determining whether the overall threshold criterion have been satisfied. Additionally, or alternatively, the threshold criterion may include a rule indicating that the threshold criterion are met if the second stage is invoked even once. Additionally, or alternatively, the threshold criterion may comprise the time integral of the runtime as multiplied by the instantaneous difference between the current ambient temperature and the current setpoint temperature.

Additionally, or alternatively, campaign scheduler 313 may select the criteria and transmit the selected criteria to smart thermostat 160 for further action. For example, after receiving the criteria from campaign scheduler 313, smart thermostat 160 may monitor the usage of HVAC system 165 and determine when the criteria have been met. After determining that the criteria have been met, smart thermostat 160 may then transmit a notification to campaign scheduler 313 indicating that the criteria have been met. Alternatively, smart thermostat 160 may determine the appropriate setpoint schedule adjustment based on additional input from campaign scheduler 313. For example, in addition to the criteria, campaign scheduler 313 may transmit the campaign parameters, as described above, to smart thermostat 160. After determining that the criteria have been met, smart thermostat 160 may then adjust the setpoint schedule based on the campaign parameters.

Setpoint engine 314 may include processes for creating and/or adjusting temperature setpoint schedules. For example, setpoint engine 314 may analyze data received from smart thermostat 160 indicating one or more usage patterns over an extended period of time. The usage patterns may include the times and temperatures at which smart thermostat 160 is caused to control HVAC system 165 in accordance with one or more user inputs. Based on the indicated patterns, setpoint engine may create a setpoint schedule for smart thermostat 160. Smart thermostat 160 may then proceed to control HVAC system 160 according to the setpoint schedule without additional input from a user. After creating a setpoint schedule, setpoint engine 314 may periodically or occasionally make adjustments to the setpoint schedule. For example, after detecting one or more adjustments made at smart thermostat 160, setpoint engine 314 may determine that the schedule should be modified based on the one or more adjustments to avoid subsequent adjustments at smart thermostat 160. As another example, setpoint engine 314 may receive instructions to modify a setpoint schedule from campaign scheduler 313. The instructions may include campaign parameters, such as adjustment amounts, times of day to make adjustments, etc. Setpoint engine 314 may proceed to modify the setpoint schedule according to the instructions received from campaign scheduler 313.

Historical data engine 315 may include processes for analyzing historical data and metrics related to the operation of HVAC systems by smart thermostats, such as HVAC system 165 by smart thermostat 160. For example, historical data engine 315 may periodically or occasionally analyze historical usage data for a plurality of HVAC systems. The historical usage data may include the total runtime of an HVAC system during a previous time period. The total runtime may be determined from data transmitted from one or more smart thermostats that control an HVAC system. In the case where multiple smart thermostats control an HVAC system, the total runtime may be the summation of the runtime caused by each smart thermostat. Historical data engine 315 may also analyze historical data collected from other sources, such as weather data system 120. For example, historical data engine 215 may analyze historical weather data to identify trends and/or abnormal weather events in connection with HVAC usage patterns. In some embodiments, data analyzed by historical data engine 315 is stored in one or more databases of the cloud-based HVAC control server system 110, such as HVAC usage database 318.

User management module 316 may include one or more processes for managing user accounts. For example, user management module 316 may access, modify, and store account details for a specific user account such as information for one or more devices owned and operated by a user associated with the account, various settings for energy saving campaigns a user account may be participating in and to what extent, payment methods, setpoint temperature preferences, or user account habits. User management module 316 may provide user account-specific information to campaign scheduler 313 to generate user account-specific campaigns and/or campaign parameters. User management module 316 may also provide user account-specific information to setpoint engine 314 to help determine what adjustments to make to a setpoint schedule associated with the user account, based on preferences associated with the user account.

In some embodiments, user management module 316 may also send communications to a user associated with a user account, such as notifications or updates, or to an application on a mobile device 140 associated with the user account. For example, user management module 316 may send an email, text, or application invitation to a specific user account to participate in an upcoming energy saving campaign. The response to the invitation may opt the user account into an upcoming campaign, all future campaigns, campaigns for a predefined amount of time in the future, and/or until a user associated with the user account opts out. In some embodiments, user accounts are opted out of future campaigns by default. Once a user account has opted in, one or more thermostats associated with the user account may begin automatically receiving setpoint schedule adjustments generated by campaign scheduler 313 and/or setpoint engine 314. Additionally, or alternatively, user management module 316 may send notifications to a user account that is opted in regarding upcoming and/or pending adjustments to a current setpoint schedule. In some embodiments, user accounts that are opted out by default will receive invitations for upcoming campaigns until a user associated with the user account actively opts out of future campaigns.

Forecast engine 317 may include one or more processes for analyzing, modifying, or generating HVAC usage forecasts. Forecast engine 317 may generate HVAC usage forecasts utilizing data received from weather data system 120 and/or HVAC usage database 318. For example, based on recent HVAC usage data and forecast weather data, forecast engine 317 may predict an overall HVAC usage for a period of time into the future. The period of time into the future may be up to a week, a month, a year, or a suitable amount of time into the future based on available forecast and historical data. Forecast engine 317 may use historical usage data for an HVAC system during a similar time period in previous years to generate HVAC usage predictions. For example, based on an average HVAC usage over the summer months in previous years, forecast engine 317 may predict the HVAC usage over the same time period in the future. Forecast engine 316 may then modify the prediction as updated weather forecasts and actual HVAC usage data becomes available.

One or more databases, such as HVAC usage database 318, may store or otherwise make data accessible to cloud-based HVAC control server system 110. HVAC usage database 318 may include data associated with historical and predicted HVAC usage by one or more HVAC systems. The historical HVAC usage data for an HVAC system may include the recorded HVAC runtime measured by one or more smart thermostats connected to the HVAC system. Cloud-based HVAC control server system 110 may include other databases for various purposes. For example, there may be a user database storing information specific to individual user accounts such as account details, campaign participation settings, HVAC system characteristics, setpoint temperature preferences etc. The one or more databases, including HVAC usage database 318, may be implemented by one or more suitable database structures such as a relational database (e.g., SQL) or a NoSQL database (e.g., MongoDB).

Processing system 319 can include one or more processors. Processing system 319 may include one or more special-purpose or general-purpose processors. Such special-purpose processors may include processors that are specifically designed to perform the functions detailed herein. Such special-purpose processors may be ASICs or FPGAs which are general-purpose components that are physically and electrically configured to perform the functions detailed herein. Such general-purpose processors may execute special-purpose software that is stored using one or more non-transitory processor-readable mediums, such as random access memory (RAM), flash memory, a hard disk drive (HDD), or a solid state drive (SSD) of cloud-based HVAC control server system 110.

One or more services included in cloud-based HVAC control system 110 may additionally, or alternatively, be included in smart thermostat 160. For example, smart thermostat 160 may include the same or similar instances of communication interface 312, setpoint engine 314, historical data engine 315, user management module 316, forecast engine 317, and processing system 319. The components included in smart thermostat 160 may perform the same or similar functions described in relation to cloud-based HVAC control server system 110 in addition to functions specific to the individual smart thermostat 160. Smart thermostat 160 may also include one or more additional components not included in cloud-based HVAC server system 110, such as an HVAC interface configured to control an HVAC system according to one or more commands generated by smart thermostat 160.

As described above, energy saving campaigns may use various criteria to determine an optimal time to initiate temperature setpoint schedule adjustments. The optimal times to initiate setpoint schedule adjustments may be when users are more likely to consent to the setpoint schedule adjustments. For example, users may be more likely to consent to schedule adjustments after an HVAC system has been running for some predefined period of time into a heating or cooling season. Determining how far an HVAC system is into a heating or cooling season may be based on a recent HVAC usage amount and a reference HVAC usage amount. HVAC usage amounts may refer to the overall runtime of an HVAC system, as caused by a thermostat, during a certain time period. For example, if a reference HVAC usage amount during a prior heating season is 100 hours, then once the current HVAC heating usage amount for an HVAC system reaches 15 hours, it may be determined that the HVAC system is 15% of the way into the heating season.

In some embodiments, the reference HVAC usage amount for an HVAC system is based on historic usage amounts for that HVAC system. For example, the amount of time an HVAC system has spent in a heating mode during a previous time period may be used as a reference HVAC heating usage amount for the same period of time in the future. The previous period of time may include a calendar year and/or an approximate heating or cooling season. In some embodiments, historical usage data from multiple prior periods of time may be averaged to determine a reference HVAC usage amount.

In some embodiments, historic usage amounts for an HVAC system are not available. For example, the HVAC system may be part of a newly constructed structure or the HVAC system may only recently have been connected to a smart thermostat capable of collecting and storing usage data for the HVAC system. In some embodiments, determining how far an HVAC system is into a heating or cooling season is based on the usage amounts for a geographically-proximate group of HVAC systems. For example, once it is determined that at least a first number of a geographically-proximate group of HVAC systems have reached a certain point into a heating or cooling season, it may be assumed that other similarly situated HVAC systems have also reached the same point into the heating or cooling season. Determining that each HVAC system in the geographically-proximate group may in turn be based on each HVAC system's respective historical usage amounts, as described above. In some embodiments, the geographically-proximate group of HVAC systems is selected based on their local proximity to each other and to a particular HVAC system. For example, the geographically-proximate group may include all HVAC systems within a predefined radius, or geographic area, surrounding the particular HVAC system. The size of the geographic area may be selected to ensure a statistically relevant sample size as well as to ensure privacy for the users of the other HVAC systems.

In some embodiments, the geographically-proximate group of HVAC systems is used to deal with outlier HVAC systems and/or avoid premature setpoint schedule modifications. An outlier HVAC system may exist when a particular HVAC system has either reached a predefined usage amount, or other threshold criterion faster than expected, or has not yet reached the predefined usage amount, or other threshold criterion, as expected. For example, based on historical usage amounts for a particular HVAC system, the amount of time necessary to reach a usage amount in the future may be predicted. However, due to one or more factors, the particular HVAC system may reach the usage amount faster than previously predicted. In this case, it may be optimal to delay setpoint schedule modifications until at least a predefined number of geographically-proximate HVAC systems have reached the same usage amount. For example, once 5%, 10%, 15%, or any whole or fractional percentage between 3% and 95%, of the geographically-proximate HVAC systems have reached the same usage amount, the setpoint schedule for the particular HVAC system may be modified. On the other hand, the particular HVAC system may not reach the usage amount as quickly as initially predicted. In this case, it may be optimal to initiate the setpoint schedule modifications as soon as at least a predefined number of geographically-proximate HVAC systems have reached the same usage amount. For example, the setpoint schedule for the particular HVAC system may be modified as soon as 85%, 90%, 95%, or any whole or fractional percentage between 3% and 95%, of the geographically-proximate HVAC systems have reached the same usage amount.

In some embodiments, minimum and maximum amounts of time to reach a threshold criterion may be predefined. For example, a minimum amount of time may be predefined as being two weeks into a particular heating or cooling season. The particular season may begin either when an HVAC system is first used according to the needs of the season (e.g., to provide heat during a heating season, or cooling during a cooling season). Alternatively, or additionally, a particular season may begin on a predefined day for a particular region based on weather forecasts and/or historical weather patterns. In some embodiments, the setpoint schedule for a particular HVAC system may not be modified until either the minimum amount of time has elapsed, a predefined number of geographically-proximate HVAC systems have reached their respective usage amounts, or both. Additionally, or alternatively, the setpoint schedule for a particular HVAC system may be modified before meeting the threshold criterion if either the maximum amount of time has elapsed, a predefined number of geographically-proximate HVAC systems have reached their respective usage amounts, or both.

Figure 4:
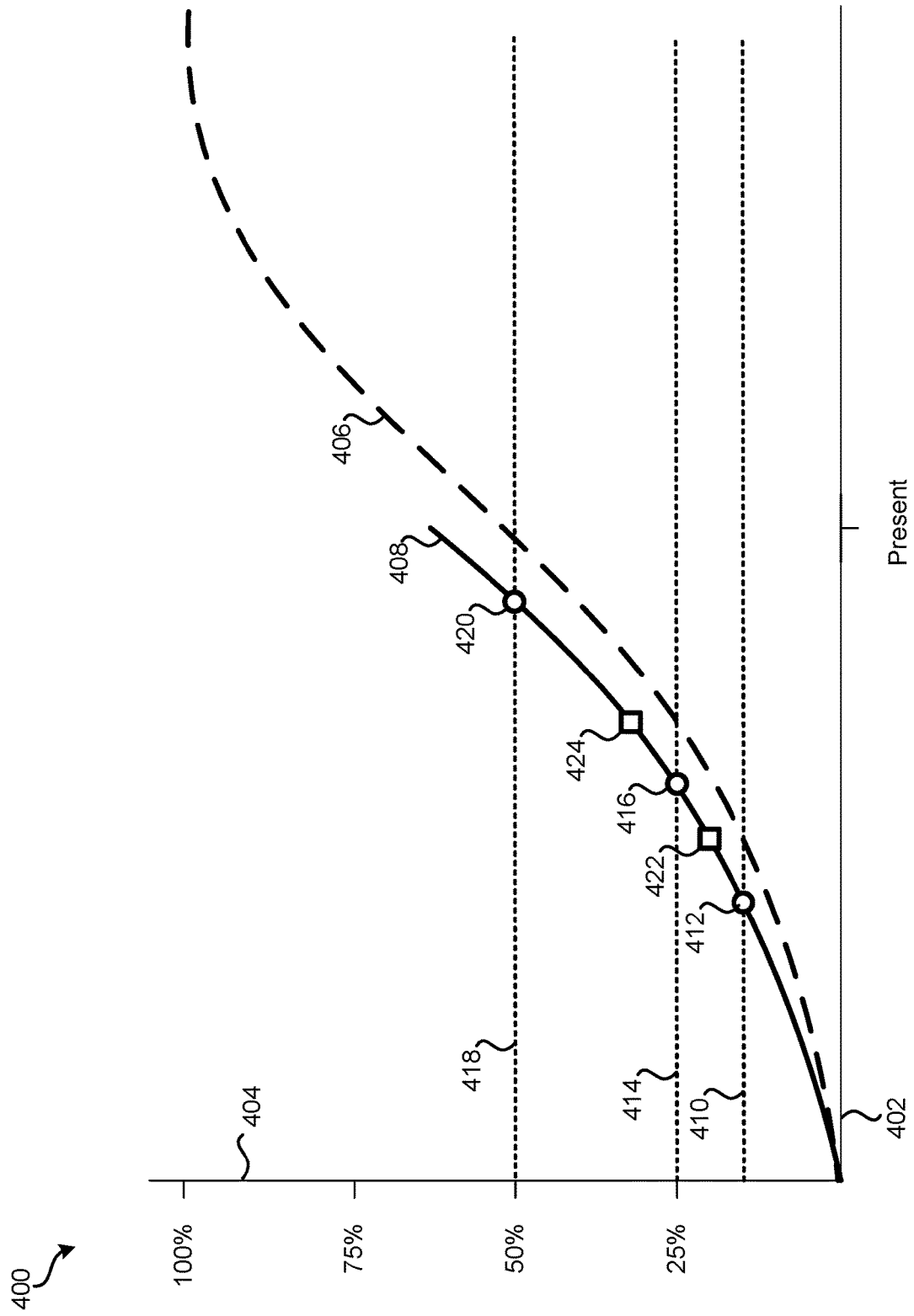
FIG. 4 illustrates a graph of an actual HVAC usage amount versus a reference HVAC usage amount used to manage thermostat setpoint schedules according to some embodiments.

FIG. 4 illustrates a graph 400 of an actual HVAC usage amount versus a reference HVAC usage amount used to manage thermostat setpoint schedules according to some embodiments. Ordinate 404 of graph 400 represents HVAC usage amounts. Abscissa 402 of graph 400 represents time over which the HVAC usage amounts occur. Graph 400 illustrates reference HVAC usage amount 406 over time. As described above, reference HVAC usage amount 406 may be the historical usage amounts for a particular HVAC system during a previous time period. The previous time period may include a past heating and/or cooling season. For example, reference HVAC usage amount 406 may represent the total runtime of a particular HVAC system in a heating mode during a previous calendar year. As another example, reference HVAC usage amount 406 may represent an average runtime of a particular HVAC system in a cooling mode during the past summer, past two summers, or more summers.

Graph 400 also illustrates current HVAC usage amount 408. Current HVAC usage amount 408 may represent the overall usage amount of a particular HVAC system from a time in the past leading up to the present. The time in the past may be selected based on the starting time for reference HVAC usage amount 406. For example, if reference HVAC usage amount 406 represents an overall HVAC runtime for a previous calendar year starting on January 1, current HVAC usage amount 408 may start at January 1 of the current calendar year. Comparing current HVAC usage amount 408 during a recent time period leading up to the present against reference HVAC usage amount 406 during a similar time period in the past, it may be seen that current HVAC usage amount 408 is greater than reference HVAC usage amount 406. This may be as a result of increased use of the particular HVAC system during the recent time period due to a recent heatwave or cold snap and/or adjustments to a setpoint schedule that cause an increase in energy usage by the particular HVAC system.

As described above, energy saving campaigns may use reference HVAC usage amount 406 to determine when to initiate setpoint schedule adjustments to decrease energy usage by the particular HVAC system. Energy saving campaigns may select threshold criterion, such as threshold usage amounts, as the optimal time to initiate setpoint schedule adjustments. The threshold usage amounts may be based on a percentage of historical HVAC usage. For example, as illustrated, an energy saving campaign may set first threshold 410 at 15% of reference HVAC usage amount 406, second threshold 414 at 25% of reference HVAC usage amount 406, and third threshold 418 at 50% of reference HVAC usage amount 406. After setting the thresholds, current HVAC usage amount 408 may be monitored to determine when it has met or exceeded each predefined threshold. For example, at may be determined that HVAC usage amount 406 for a particular HVAC system has met first threshold 410 after a first time period leading up to first time 412, second threshold 414 after a second time period extending from first time 412 to second time 416, and third threshold 418 after a third time period extending from second time 416 to third time 420. At each of first time 412, second time 416, and third time 420, setpoint schedule adjustments may be made to decrease energy usage by the particular HVAC system. Energy campaigns may set thresholds at any percentage of the historical usage amount such as: at 5%, 30%, and 60%; at 10%, 50%, and 75%; or another suitable set or subset of percentages based on the perceived likelihood of a user to consent to setpoint schedule adjustments. Similarly, energy campaigns may define threshold time limits before which setpoint schedule adjustments may not occur, regardless of whether a particular usage threshold has been met (e.g., a minimum amount of time) and/or by when setpoint schedule adjustments must occur regardless of whether a usage threshold has not been met (e.g., a maximum amount of time).

In some embodiments, reference HVAC usage amount 406 includes a combination of the HVAC usage amounts for a geographically-proximate group of HVAC systems. The geographically-proximate group of HVAC systems may include all HVAC systems within a predefined distance of a particular HVAC system. For example, the geographically-proximate group of HVAC systems may include all HVAC systems within the same neighborhood, local community, ZIP code, county, state, region, or similarly suitable distance to provide a statistically significant sample size and provide privacy to the owners of each HVAC system in the group. The combination of the HVAC usage amounts for the geographically-proximate group of HVAC systems may be the median current HVAC usage amount of each HVAC system as compared to a respective threshold criterion, such as the historical usage amount of the respective HVAC system. For example, reference HVAC usage amount 406 may track when a median number of geographically-proximate HVAC systems have met and/or exceeded their respective usage threshold criterion.

As further described above, energy saving campaigns may initiate setpoint schedule adjustments based on geographically-proximate HVAC systems meeting and/or exceeding their respective threshold criterion. For example, as illustrated, a setpoint schedule adjustments for a particular HVAC system may be initiated at first point 422 when a median number of geographically-proximate HVAC systems have met first threshold 410 and/or at second point 424 when a median number of geographically-proximate HVAC systems have met second threshold 414.

Figure 5:
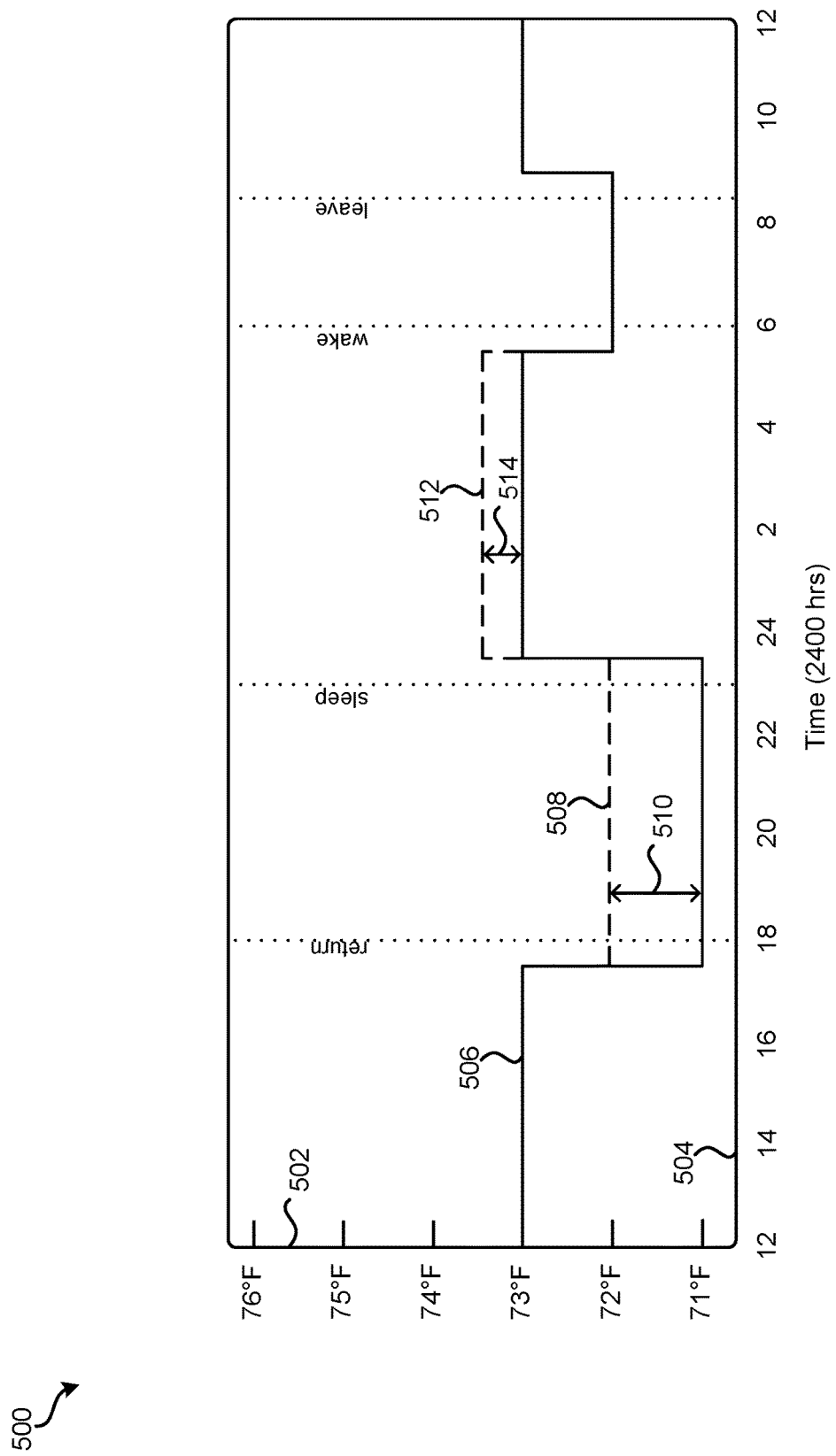
FIG. 5 illustrates a graph of a cooling season temperature setpoint schedule adjusted to decrease energy usage by an HVAC system according to some embodiments.

FIG. 5 illustrates a graph 500 of a cooling season temperature setpoint schedule adjusted to decrease energy usage by an HVAC system according to some embodiments. Ordinate 502 of graph 500 represents temperature in degrees Fahrenheit. While illustrated in degrees Fahrenheit, temperature setpoint schedules may also be in degrees Celsius. Abscissa 504 of graph 500 represents time in hours over the period of a day starting at noon and ending at noon the following day. Graph 500 illustrates temperature setpoint schedule 506 in degrees over time during a cooling season when an HVAC system would likely be operated in a cooling mode. While temperature setpoint schedule 506 is intended for a cooling season, similar schedules may be intended for heating seasons when an HVAC system is likely to be operated in a heating mode. Temperature setpoint schedule 506 may represent a desired target temperature for an environment within a structure, such as a climate zone, over time. A thermostat, such as smart thermostat 160 as described above, may control an HVAC system based on temperature setpoint schedule 506. For example, a thermostat may cause an HVAC system to operate in a cooling mode to decrease the ambient temperature within an environment until the ambient temperature reaches the temperature set by temperature setpoint schedule 506.

Temperature setpoint schedule 506 may include one or more temperature setpoints. Each temperature setpoint may indicate the desired target temperature for the environment at a particular point in time. The temperature setpoints within temperature setpoint schedule 506 may be different at varying points throughout a day and may be different at the same point in a day compared to other days. Temperature setpoint schedule 506 may be set to repeat on a daily, weekly, monthly, or other repeating basis. Additionally, or alternatively, temperature setpoint schedule 506 may be based on activities detected or predicted within the environment. For example, the temperature setpoints within temperature setpoint schedule 506 may be lower during times when occupants are present and active within the environment compared with times during which occupants are present but potentially asleep.

As described above, energy saving campaigns may make adjustments to a temperature setpoints schedule to decrease energy usage by an HVAC system by which the temperature setpoint schedule is controlled. One or more temperature setpoints included in a temperature setpoint schedule may be adjusted to decrease energy usage. For example, as illustrated in graph 500, first adjustment 508 may be made to the temperature setpoint between 1800 hours and 2400 hours to increase the desired temperature within the environment from 71 degrees to 72 degrees. As another example, second adjustment 512 may be made to the temperature setpoint between 2400 hours and 0600 hours to increase the desired temperature from 73 degrees to 73.5 degrees. Increasing a temperature setpoint during a cooling season may result in an HVAC system operating less compared to the original desired temperature, thereby decreasing energy usage by the HVAC system. Similarly, decreasing the temperature setpoint during a heating season may also result in the HVAC system operating less.

In some embodiments, energy saving campaigns make adjustments using varying magnitudes. For example, as illustrated, first adjustment 508 may include adjusting the temperature setpoint by first magnitude 510 corresponding to a 1 degree adjustment from 71 degrees to 72 degrees. As another example, second adjustment 512 may include adjusting the temperature setpoint by second magnitude 514 corresponding to a 0.5 degree adjustment from 73 degrees to 73.5 degrees. Using greater adjustment magnitudes may result in a greater decrease in energy usage by an HVAC system compared with lesser adjustment magnitudes. In some embodiments, the adjustment magnitude is selected by an authorized user of the HVAC system. For example, a request for a selection between a first adjustment magnitude and a second adjustment magnitude may be transmitted to a computerized device linked to an authorized user of an HVAC system. One or more temperature setpoints in a temperature setpoint schedule may then be adjusted based on the received selection of the first adjustment magnitude or the second adjustment magnitude.

Figure 6:
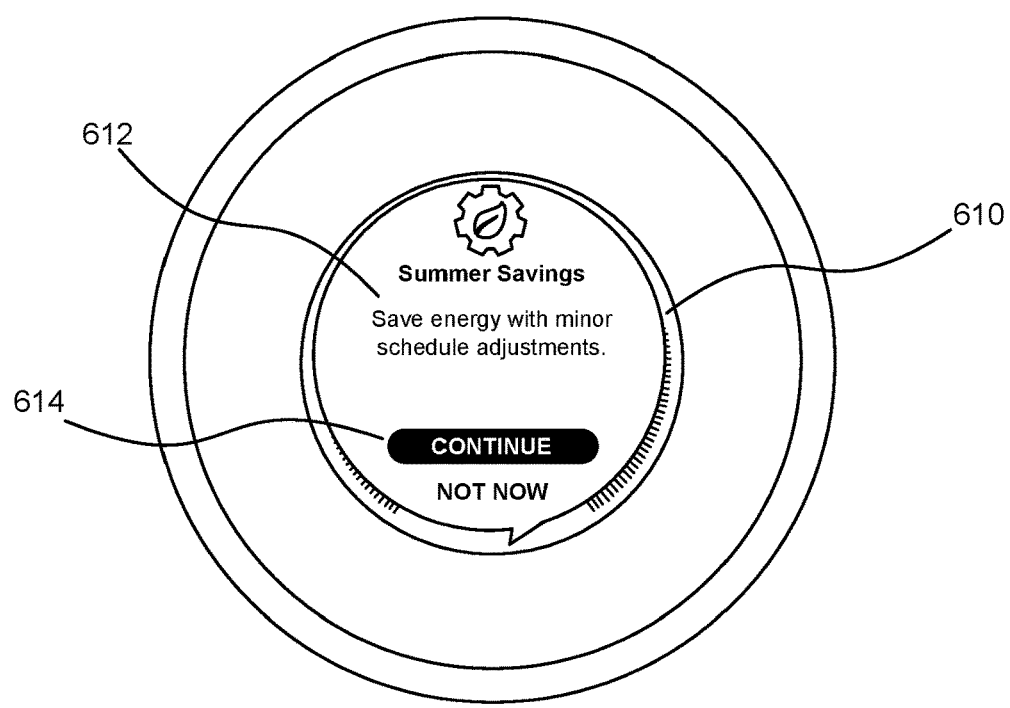
FIG. 6 illustrates an embodiment of a smart thermostat with a user interface.

FIG. 6 illustrates an embodiment of a smart thermostat 600 with a user interface. In some embodiments, smart thermostat 600 indicates that an energy saving temperature setpoint schedule adjustment, with which smart thermostat 600 can control an HVAC system, is available. For example, smart thermostat 600 may make a sound or alter a graphical user interface (GUI), such as GUI 610. The temperature setpoint schedule adjustment may be generated as part of an energy saving campaign. For example, after determining that the usage amount of an HVAC system controlled by smart thermostat 600 has met an HVAC runtime threshold, as described above, a notification may be transmitted to smart thermostat 600. The notification may include the temperature setpoint schedule adjustment. Alternatively, the notification may include instructions for smart thermostat 600 to generate the temperature setpoint schedule adjustment.

After the notification is received at smart thermostat 600, smart thermostat 600 may present the notification, or a summary of the notification on a display coupled to the thermostat. For example, GUI 610 may display brief summary 612 indicating that a user could save energy by making adjustments to their setpoint temperature schedule. In some embodiments, smart thermostat 600 displays details of the temperature setpoint schedule adjustment. For example, brief summary 612 may indicate the magnitude of the adjustments. As another example, brief summary 612 may indicate during which times one or more adjustments will take place.

In some embodiments, the notification is transmitted to smart thermostat 600 before smart thermostat 600 begins controlling the HVAC system according to the generated temperature setpoint schedule adjustment. For example, the notification may be transmitted one day, two days, one week, or a similarly suitable time in advance of the temperature setpoint schedule adjustment taking effect. In some embodiments, controlling the HVAC system by smart thermostat 600 according to the temperature setpoint schedule adjustment is in response to receiving approval from an authorized user of smart thermostat 600. For example, smart thermostat 600 may display options 614 for a user to approve, and/or make modifications to, the temperature setpoint schedule adjustment. After receiving approval at an input of smart thermostat 600, smart thermostat 600 may proceed to control an HVAC system in accordance with the temperature setpoint schedule adjustment.

Additionally, or alternatively, the notification may be transmitted to an electronic device associated with smart thermostat 600. For example, the notification may be transmitted to a mobile device associated with an authorized user of smart thermostat 600, such as mobile device 140. As another example, the notification may be transmitted to a hub device associated with smart thermostat 600, such as hub device 150. In some embodiments, notifications are transmitted to either smart thermostat 600, a mobile device, and/or a hub device based on one or more account settings associated with smart thermostat 600. The one or more account settings may indicate whether the account, or an authorized user of the account, has previously opted into one or more energy saving campaigns.

In some embodiments, the notification is transmitted to a mobile device associated with smart thermostat 600 upon determining that the one or more account settings indicate that the account has opted into an energy saving campaign. Based on the account having opted into the campaign, the notification may indicate that smart thermostat 600 will begin controlling the HVAC system according to the temperature setpoint schedule adjustments. In some embodiments, the notification is transmitted to both a mobile device and smart thermostat 600 upon determining that the account has not yet opted into the campaign. Based on this determination, the notification may indicate that the temperature setpoint schedule adjustment is available and may wait to begin controlling the HVAC system according to the temperature setpoint schedule adjustments until after an authorized user of the account approves the temperature setpoint schedule adjustments.

Figure 7:
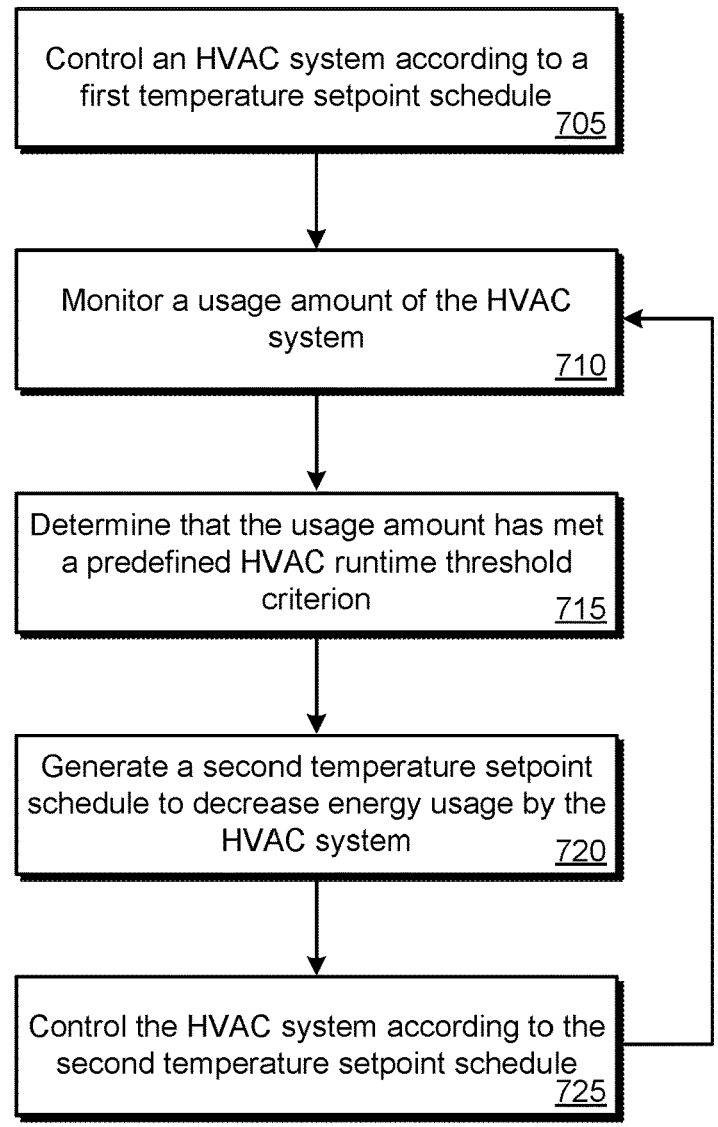
FIG. 7 illustrates an embodiment of a method of optimizing energy consumption of an HVAC system.

Various methods may be performed using the systems and arrangements detailed in relation to FIGS. 1-6. FIG. 7 illustrates an embodiment of a method 700 of optimizing energy consumption of an HVAC system. In some embodiments, method 700 is performed by a cloud-based HVAC control server system, such as cloud-based HVAC control server system 110 as described above. For example, processing system 319 of cloud-based HVAC control server system 110 may execute software from one or more modules such as campaign scheduler 313, setpoint engine 214, and/or forecast engine 217. In some embodiments, method 700 is performed by a smart device, such as smart thermostat 160 as described above. In some embodiments, one or more blocks of method 700 are performed by a cloud-based HVAC control server system while other blocks are performed by a smart thermostat.

Method 700 may include, at block 705, controlling an HVAC system according to a first temperature setpoint schedule. The first temperature setpoint schedule may include one or more temperature setpoints as described above. For example, the setpoint schedule may include a temperature setpoint for daytime and another temperature setpoint for nighttime. A smart thermostat may measure the ambient temperature within an environment and cause the HVAC system to operate in a heating or cooling mode until the ambient temperature reaches the temperature setpoint. The smart thermostat may continue to control the HVAC system according to the first temperature setpoint schedule during a first time period, such as the beginning of a heating or cooling season.

At block 710, a usage amount of the HVAC system may be monitored. As the smart thermostat controls the HVAC system, the smart thermostat may monitor and/or record the amount of HVAC usage caused by the smart thermostat. The HVAC usage may be as a result of maintaining the ambient temperature within an environment at, or close to, the temperature setpoints of the first temperature setpoint schedule. The HVAC usage may be measured by the amount of time the HVAC system is actively operating in a heating or cooling mode. In some embodiments, the HVAC usage indicates the combined HVAC usage as a result of multiple smart thermostats used to control the HVAC system. For example, the HVAC system may be controlled by multiple smart thermostats to provide varying amounts of heating or cooling to separate climate zones within an environment or structure.

Method 700 may also include, at block 715, determining that the usage amount has met a predefined HVAC runtime threshold criterion. As the smart thermostat continues controlling the HVAC system in accordance with the first temperature setpoint schedule, the HVAC usage amount during the first time period may continue to increase. As the HVAC usage amount increases it may meet or exceed one or more predefined HVAC runtime threshold criterion. A remote provider, such as a cloud-based HVAC server system may select the predefined HVAC runtime threshold criterion as the optimal times at which to make energy saving adjustments to the first temperature setpoint schedule. Predefined HVAC runtime threshold criterion may be selected to coincide with a certain point in time during a current heating or cooling season. For example, the predefined HVAC runtime threshold criterion may be selected to occur when approximately 15% of the total expected HVAC usage for a heating or cooling season has already been used. The total expected HVAC usage for a heating or cooling season may be determined based on reference usage amounts. For example, the total expected HVAC usage may be based on historical usage data indicating a total runtime of the HVAC system during a previous time period, such as a heating or cooling season. Additionally, or alternatively, the total expected HVAC usage may be based on a cohort of geographically-proximate HVAC systems.

At block 720, a second temperature setpoint schedule may be generated to decrease energy usage by the HVAC system. The second temperature setpoint schedule may be generated after determining that the usage amount of the HVAC system during the first time period has met the predefined HVAC runtime threshold criterion. In some embodiments, the second temperature setpoint schedule includes one or more temperature setpoints from the first temperature setpoint schedule with at least one of the temperature setpoints being adjusted to decrease energy usage by the HVAC system. Adjusting the temperature setpoints to decrease energy usage may include increasing or decreasing the temperature setpoint in the second temperature setpoint schedule compared to the first temperature setpoint schedule. For example, increasing a temperature setpoint during a cooling season may result in the HVAC system running less frequently, thereby consuming less energy.

At block 725, the HVAC system may be controlled according to the second temperature setpoint schedule. In some embodiments, the smart thermostat will automatically begin controlling the HVAC system according to the second temperature setpoint schedule. For example, an authorized user of an account associated with the smart thermostat may have previously approved subsequent adjustments to their temperature setpoint schedule in order to save energy. In some embodiments, the smart thermostat begins controlling the HVAC system according to the second temperature setpoint schedule after receiving approval from an authorized user. For example, an authorized user may receive a notification indicating that the usage amount has met the predefined HVAC runtime threshold criterion and/or that the second temperature setpoint schedule has been generated. The notification may also include a request for the authorized user to approve the second temperature setpoint schedule. Once the authorized user approves the second temperature setpoint schedule, the smart thermostat may begin controlling the HVAC system according to the second temperature setpoint schedule.

Preferred embodiments described herein have been found particularly advantageous when the migration from the first setpoint schedule to the second setpoint schedule is carried out in a gradual manner. For example, controlling the HVAC system according to the second setpoint schedule may include implementing incremental setpoint temperature adjustments, such as 0.1 degrees Celsius, at any particular setpoint time over a period of time, such as a week or 10 days, until the HVAC system is controlled according to the second setpoint schedule. Additionally, or alternatively, the second setpoint schedule may be created with multiple incremental schedule changes. In some embodiments, the migration from the first setpoint schedule to the second setpoint schedule may occur in a manner similar to that described in U.S. Pat. No. 9,298,197, and/or in a manner similar to that used by Google® Nest's® Seasonal Savings Program®, with the combination being especially effective from a user perceived comfort and satisfaction viewpoint in addition to an energy saving viewpoint.

In some embodiments, method 700 returns to block 710. For example, the usage amount of the HVAC system may continue to be monitored until it reaches one or more subsequent runtime threshold criterion. As the usage amount meets or exceeds each subsequent runtime threshold criterion, additional temperature setpoint adjustments may be made to further decrease energy usage by the HVAC system. For example, a subsequent predefined HVAC runtime threshold criterion may be selected to occur when approximately 25% of the total expected HVAC usage for the heating or cooling season has already been used. Once it is determined that the combined usage amount from the first temperature setpoint schedule and the second temperature setpoint schedule exceed the subsequent predefined HVAC runtime threshold criterion, a third temperature setpoint schedule based on the second temperature schedule may be generated.

In some embodiments, method 700 ends after completion of block 725. For example, after controlling the HVAC system according to the second temperature setpoint schedule, and/or subsequent temperature setpoint schedules as generated by repeating blocks 710-720, the HVAC system may again be controlled by the first temperature setpoint schedule. Additionally, or alternatively, the HVAC system may be controlled by a new temperature setpoint schedule. In some embodiments, method 700 ends after a predetermined amount of time. For example, the end of an energy saving campaign, and/or a heating/cooling season may result in the HVAC system being controlled by the first temperature setpoint schedule or a new temperature setpoint schedule.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known processes, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method of optimizing energy consumption of a heating, ventilation, and air conditioning (HVAC) system, comprising:
    controlling, via a thermostat, the HVAC system during a predetermined time period according to a first setpoint schedule comprising one or more first setpoints;
    monitoring, via the thermostat, a first cumulative runtime of the HVAC system during a first time period of the predetermined time period;
    determining that the first cumulative runtime of the HVAC system during the first time period has met a first predefined HVAC runtime threshold criterion;
    after determining that the first cumulative runtime of the HVAC system during the first time period has met the first predefined HVAC runtime threshold criterion, generating a second setpoint schedule for a second time period of the predetermined time period comprising one or more second setpoints to decrease energy usage by the HVAC system compared to the first setpoint schedule for the second time period; and
    controlling, via the thermostat, the HVAC system during the second time period according to the second setpoint schedule, wherein the second time period occurs after the first time period.

2. The method of optimizing energy consumption of the HVAC system of claim 1, further comprising:
    accessing historical usage data indicating a total runtime of the HVAC system during a previous time period; and
    defining the first predefined HVAC runtime threshold criterion based on a fraction of the total runtime of the HVAC system during the previous time period.

3. The method of optimizing energy consumption of the HVAC system of claim 2, wherein:
    accessing the historical usage data comprises receiving, from a plurality of thermostats coupled to the HVAC system, a respective runtime of the HVAC system caused by each of the plurality of thermostats during the previous time period; and
    the total runtime of the HVAC system during the previous time period is determined by adding, for each thermostat of the plurality of thermostats, the respective runtime of the HVAC system.

4. The method of optimizing energy consumption of the HVAC system of claim 2, wherein the total runtime of the HVAC system during the previous time period comprises either a first runtime of the HVAC system in a cooling mode, a second runtime of the HVAC system in a heating mode, or a summation of the first runtime and the second runtime.

5. The method of optimizing energy consumption of the HVAC system of claim 1, further comprising:
    monitoring a second cumulative runtime of the HVAC system during the second time period;
    determining that a summation of the first cumulative runtime and the second cumulative runtime exceeds a second threshold criterion;
    generating a third setpoint schedule based on the second setpoint schedule; and
    controlling the HVAC system during a third time period of the predetermined time period according to the third setpoint schedule, wherein controlling the HVAC system according to the third setpoint schedule causes the HVAC system to be active less frequently compared to the second setpoint schedule for the third time period.

6. The method of optimizing energy consumption of the HVAC system of claim 1, further comprising:
    monitoring a plurality of cumulative runtimes for a geographically-proximate group of HVAC systems during the first time period, wherein each HVAC system of the geographically-proximate group of HVAC systems has a respective cumulative runtime of the plurality of cumulative runtimes and a respective usage threshold criterion; and
    determining, for each HVAC system of the geographically-proximate group of HVAC systems, that the respective cumulative runtime has met the respective usage threshold criterion; and
    wherein determining that the first cumulative runtime of the HVAC system during the first time period has met the first predefined HVAC runtime threshold criterion comprises:
        determining, for at least a first number of the geographically-proximate group of HVAC systems, that the respective cumulative runtime exceeds the respective usage threshold criterion.

7. The method of optimizing energy consumption of the HVAC system of claim 1, further comprising:
    transmitting, to an electronic device associated with the HVAC system, a notification indicating that the first cumulative runtime of the HVAC system during the first time period met the first predefined HVAC runtime threshold criterion, wherein the notification is transmitted before the HVAC system is controlled according to the second setpoint schedule.

8. The method of optimizing energy consumption of the HVAC system of claim 7, further comprising:
    receiving, after transmitting the notification, an approval to use the second setpoint schedule from an authorized user associated with the HVAC system; and
    wherein controlling the HVAC system during the second time period is in response to receiving the approval to use the second setpoint schedule.

9. The method of optimizing energy consumption of the HVAC system of claim 8, further comprising:

receiving the notification at a thermostat coupled to the HVAC system;
presenting the notification on a display coupled to the thermostat; and
receiving, at an input of the thermostat, the approval of the second setpoint schedule.

10. The method of optimizing energy consumption of the HVAC system of claim 1, wherein generating the second setpoint schedule comprises adjusting each of the one or more first setpoints by a fixed temperature adjustment value.

11. The method of optimizing energy consumption of the HVAC system of claim 1, further comprising:
transmitting, by a cloud-based server system, a request, to a computerized device linked to an authorized user of the HVAC system, for a selection between a first adjustment magnitude and a second adjustment magnitude, wherein the second adjustment magnitude is greater than the first adjustment magnitude; and
receiving, after transmitting the request, a selection from the first adjustment magnitude and the second adjustment magnitude; and
wherein at least one of the one or more second setpoints in the second setpoint schedule is set based on an application of the first adjustment magnitude or the second adjustment magnitude to a corresponding at least one of the one or more first setpoints in the first setpoint schedule.

12. A system for optimizing energy consumption of a heating, ventilation, and air conditioning (HVAC) system, the system comprising:
a cloud-based HVAC control server system, comprising:
one or more processors; and a memory communicatively coupled with and readable by the one or more processors and having stored therein processor-readable instructions which, when executed by the one or more processors, cause the one or more processors to:
control the HVAC system during a predetermined time period according to a first setpoint schedule comprising one or more first setpoints;
monitor a first cumulative runtime of the HVAC system during a first time period of the predetermined time period;
determine that the first cumulative runtime of the HVAC system during the first time period has met a first threshold criterion;
generate a second setpoint schedule for a second time period of the predetermined time period comprising one or more second setpoints to decrease energy usage by the HVAC system compared to the first setpoint schedule for the second time period; and
control the HVAC system during the second time period according to the second setpoint schedule, wherein the second time period occurs after the first time period.

13. The system for optimizing energy consumption of the HVAC system of claim 12, further comprising:
a plurality of HVAC systems, the plurality of HVAC systems comprising the HVAC system; and
a plurality of thermostats, wherein at least one of the plurality of thermostats is coupled to the HVAC system and configured to control the HVAC system according to the first setpoint schedule and the second setpoint schedule.

14. The system for optimizing energy consumption of the HVAC system of claim 13, wherein the plurality of HVAC systems further comprises a geographically-proximate group of HVAC systems, the geographically-proximate group of HVAC systems being geographically-proximate to the HVAC system, and the processor-readable instructions further cause the one or more processors to:
monitor a plurality of cumulative runtimes for the geographically-proximate group of HVAC systems during the first time period, wherein each HVAC system of the geographically-proximate group of HVAC systems has a respective cumulative runtime of the plurality of cumulative runtimes and a respective usage threshold criterion; and
determine, for each HVAC system of the geographically-proximate group of HVAC systems, that the respective cumulative runtime exceeds the respective usage threshold criterion; and
wherein determining that the first cumulative runtime of the HVAC system during the first time period has met the first threshold criterion comprises:
determining, for at least a first number of the geographically-proximate group of HVAC systems, that the respective cumulative runtime exceeds the respective usage threshold criterion.

15. The system for optimizing energy consumption of the HVAC system of claim 12, further comprising an electronic device associated with the HVAC system, wherein the electronic device is configured to:
receive, from the cloud-based HVAC control server system, a notification indicating that the first cumulative runtime of the HVAC system during the first time period exceeded the first threshold criterion.

16. The system for optimizing energy consumption of the HVAC system of claim 15, wherein the electronic device is further configured to:
receive, at a user interface of the electronic device, an approval to use the second setpoint schedule; and
wherein controlling the HVAC system during the second time period is in response to receiving the approval to use the second setpoint schedule.

17. A non-transitory processor-readable medium, comprising processor-readable instructions configured to cause one or more processors to:
control, via a thermostat, an HVAC system during a predetermined time period according to a first setpoint schedule comprising one or more first setpoints;
monitor a plurality of cumulative runtimes for a geographically-proximate group of HVAC systems during a first time period of the predetermined time period, wherein each HVAC system of the geographically-proximate group of HVAC systems has a respective cumulative runtime of the plurality of cumulative runtimes and a respective usage threshold criterion;
determine, for at least a first number of the geographically-proximate group of HVAC systems, that the respective cumulative runtime exceeds the respective usage threshold criterion;
generate, after it is determined that the respective cumulative runtime exceeds the respective usage threshold criterion for at least the first number of the geographically-proximate group of HVAC systems, a second setpoint schedule for a second time period of the predetermined time period comprising one or more second setpoints to decrease energy usage by the HVAC system compared to the first setpoint schedule for the second time period; and
control, via the thermostat, the HVAC system during the second time period according to the second setpoint schedule, wherein the second time period occurs after the first time period.

18. The non-transitory processor-readable medium of claim 17, wherein the processor-readable instructions are further configured to cause the one or more processors to:
- access respective historical usage data for each HVAC system of the geographically-proximate group of HVAC systems, wherein the respective historical usage data indicates a total runtime during a previous time period; and
- define the respective usage threshold criterion for each HVAC system of the geographically-proximate group of HVAC systems based on a fraction of the total runtime during the previous time period indicated by the respective historical usage data.

19. The non-transitory processor-readable medium of claim 17, wherein the processor-readable instructions are further configured to cause the one or more processors to:
- monitor, via the thermostat, a first cumulative runtime of the HVAC system during a third time period of the predetermined time period;
- define, based on the first cumulative runtime of the HVAC system during the third time period, a usage threshold criterion for the HVAC system;
- determine that a second cumulative runtime of the HVAC system during a fourth time period of the predetermined time period has met the usage threshold criterion for the HVAC system, wherein the fourth time period occurs after the third time period; and
- control, via the thermostat, the HVAC system during a fifth time period of the predetermined time period according to a third setpoint schedule, wherein the fifth time period occurs after the fourth time period.

20. The non-transitory processor-readable medium of claim 17, wherein the first number is determined to be the median of the geographically-proximate group of HVAC systems.

* * * * *